United States Patent
Eisenstadt et al.

(10) Patent No.: US 7,080,341 B2
(45) Date of Patent: Jul. 18, 2006

(54) APPARATUS AND METHOD FOR INTEGRATED CIRCUIT POWER MANAGEMENT

(76) Inventors: Robert Eisenstadt, 1156 Golden Way, Los Altos, CA (US) 94021; Jon Shiell, 801 Seabury Dr., San Jose, CA (US) 95136

( * ) Notice: Subject to any disclaimer, the term of this patent is extended or adjusted under 35 U.S.C. 154(b) by 0 days.

(21) Appl. No.: 10/938,855

(22) Filed: Sep. 9, 2004

(65) Prior Publication Data
US 2005/0091629 A1  Apr. 28, 2005

Related U.S. Application Data

(60) Provisional application No. 60/565,926, filed on Apr. 28, 2004, provisional application No. 60/501,559, filed on Sep. 9, 2003.

(51) Int. Cl.
*G06F 17/50* (2006.01)

(52) U.S. Cl. ............................. 716/13; 716/14

(58) Field of Classification Search ............... 716/1–15
See application file for complete search history.

(56) References Cited

U.S. PATENT DOCUMENTS

| | | | |
|---|---|---|---|
| 6,167,560 A * | 12/2000 | Jenkins et al. ............... | 716/17 |
| 6,314,549 B1 * | 11/2001 | Shau ............................ | 716/16 |
| 6,396,137 B1 | 5/2002 | Klughart | |
| 6,584,596 B1 * | 6/2003 | Buffet et al. .................. | 716/1 |
| 6,779,163 B1 * | 8/2004 | Bednar et al. ................. | 716/7 |
| 6,820,240 B1 * | 11/2004 | Bednar et al. ................. | 716/1 |
| 6,883,152 B1 * | 4/2005 | Bednar et al. ................. | 716/5 |
| 2003/0061571 A1 * | 3/2003 | Buffet et al. .................. | 716/1 |
| 2004/0268278 A1 * | 12/2004 | Hoberman et al. ........... | 716/5 |

OTHER PUBLICATIONS

Rakhmatov et al. (2002) "Battery-Conscious Task Sequencing for Portable Devices Including Voltage/Clock Scaling." DAC 2002, Jun. 10-14, 2002, New Orleans, LA.

Usami et al. (1998) "Design Methodology of Ultra Low-power MPEG4 Codec Core Exploiting Voltage Scaling Techniques." DAC 1998, San Francisco, CA.

National Semiconductor, "Powering Mobile Devices" located on the World Wide Web at http://www.national.com/appinfo/power/powerwise.html (2002).

* cited by examiner

*Primary Examiner*—Vuthe Siek
*Assistant Examiner*—Binh Tat
(74) *Attorney, Agent, or Firm*—Stephen J. LeBlanc; Quine Intellectual Property Law Group, P.C.

(57) ABSTRACT

Methods and/or associated devices and/or systems for providing power management in electronic circuits, including custom ICs, programmable logic devices, and application specific integrated circuits (ASICs) places portions of various power management solutions in the I/O ring or in I/O macros. The invention has numerous specific embodiments and applications to a wide variety of ICs and logic or other circuit design components including circuit modules, software descriptions of circuit modules and/or design or simulation or test systems for circuit development.

23 Claims, 18 Drawing Sheets

FIG. 8

|  | I/O Macro | I/O Macro | VSSIO | Empty | VDDcore | I/O Macro | VSScore | VDDIO | I/O Macro | I/O Macro | VDDIO | I/O Macro |  |
|---|---|---|---|---|---|---|---|---|---|---|---|---|---|
| I/O Macro | | | | | | | | | | | | | I/O Macro |
| VDDIO | | | | | | | | | | | | | I/O Macro |
| I/O Macro | | This IC's core utilizes all available core space, and there are empty macro slots in the pad ring, making this IC core limited. The power gating transistor macros can be placed in the empty I/O macro slots without increasing die size. The macro slots can be reordered to shift the empty slots to be next to the VDDcore macros for correct power gating transistor macro placment. | | | | | | | | | | | VSSIO |
| Empty | | | | | | | | | | | | | I/O Macro |
| VSScore | | | | | | | | | | | | | Empty |
| I/O Macro | | | | | | | | | | | | | I/O Macro |
| VDDcore | | | | | | | | | | | | | VDDcore |
| I/O Macro | | | | | | | | | | | | | I/O Macro |
| VSSIO | | | | | | | | | | | | | VSScore |
| Empty | | | | | | | | | | | | | VDDIO |
| I/O Macro | | | | | | | | | | | | | I/O Macro |
|  | I/O Macro | I/O Macro | VDDIO | I/O Macro | VSScore | Empty | VDDcore | Empty | I/O Macro | I/O Macro | VSSIO | I/O Macro |  |

FIG. 9

|  | I/O Macro | I/O Macro | I/O Macro | VDDIO | I/O Macro | I/O Macro | VDDcore | I/O Macro | VSScore | VSSIO | I/O Macro | I/O Macro |  |
|---|---|---|---|---|---|---|---|---|---|---|---|---|---|
| I/O Macro | | | | | | | | | | | | | I/O Macro |
| I/O Macro | | | | | | | | | | | | | VDDIO |
| VDDIO | | | | | | | | | | | | | I/O Macro |
| I/O Macro | | This IC's core is smaller than the I/O area's inner parimeter, making this a pad limited IC. There are no empty macro slots in the I/O area available to provide space for the power gating transistor macros. | | | | | | | | | | | I/O Macro |
| VSScore | | | | | | | | | | | | | I/O Macro |
| I/O Macro | | | | | | | | | | | | | VSScore |
| VDDcore | | | | | | | | | | | | | I/O Macro |
| I/O Macro | | | | | | | | | | | | | VDDcore |
| I/O Macro | | | | | | | | | | | | | I/O Macro |
| VSSIO | | | | | | | | | | | | | VSSIO |
| I/O Macro | | | | | | | | | | | | | I/O Macro |
|  | I/O Macro | I/O Macro | I/O Macro | VDDIO | I/O Macro | VDDcore | I/O Macro | VSScore | I/O Macro | VSSIO | I/O Macro | I/O Macro |  |

APPARATUS AND METHOD FOR INTEGRATED CIRCUIT POWER MANAGEMENT

CROSS REFERENCE TO RELATED APPLICATIONS

This application claims priority from provisional patent application 60/501,559 filed 9 Sep. 2003 and 60/565,926 filed 28 Apr. 2004, both incorporated herein by reference.

FIELD OF THE INVENTION

The present invention relates to electronic circuits. More particularly, the present invention according to specific embodiments is related to a method and/or associated apparatus and/or system for providing power management in electronic circuits, including custom ICs, programmable logic devices, and application specific integrated circuits (ASICs). According to further embodiments, the present invention is related to a method for providing multiple power levels in various types of IC environment.

COPYRIGHT NOTICE

Permission is hereby granted to make copies of this application and parts thereof solely in connection with the making of facsimile copies of this patent document in accordance with applicable law; all other rights are reserved, and all other reproduction, distribution, creation of derivative works based on the contents, public display, and public performance of the application or any part thereof are prohibited by the copyright laws.

BACKGROUND

Transistors in digital Integrated Circuit's (IC's) act as switches and can be turned on or turned off to create various logic functions. Typically, when the transistors are turned on they conduct their maximum current, when they have been turned off they conduct their minimum current, which is known as leakage current. When an IC is active, its logic consumes dynamic current related to switching node capacitances, and its inactive logic consumes leakage current. When an IC's logic is inactive it only consumes leakage current. As IC fabrication processes advance transistor sizes shrink, and smaller transistors generally have inherently larger leakage currents than larger transistors due to various effects of device physics. Leakage current is especially important for battery-powered devices that contain IC's since the leakage current will drain the battery even if the device isn't being used. For example, cell phones need to be recharged frequently even if they remain idle, due to the IC leakage currents draining the battery. If the IC leakage current in battery-powered devices such as cell phones can be reduced then battery life would be increased resulting in a better product.

Existing approaches for reducing IC leakage current generally increase design costs due to the use of specialized processes, libraries, larger macros, and/or additional CAD tools. Among some approaches discussed for use in the industry are: (A) Using a special non-standard, low leakage IC processes, which increases cost and greatly reduces design performance; (B) Using a special non-standard dual threshold IC process, which increases costs, provides the following 2 approaches: (1) Fast macros for circuit layout design based on low threshold (high leakage) transistors used for timing critical paths. Slow macros based on high threshold (low leakage) transistors used for slower paths. This approach requires additional CAD tools and a more complex design flow. (2) Use macros that contain high threshold (low leakage) transistors to gate off power in sleep mode, and fast low threshold (high leakage) transistors to be activated in operating mode. This approach results in larger library macros, which increase library macro area and design cost. (3) Dynamically vary VDD supply voltage, increase VDD for higher performance, and lower VDD to reduce performance and leakage current. This approach is unavailable as a standard design flow, requires complex analog controls, plus more extensive verification to validate performance at additional VDD levels. (4) Variable Threshold CMOS, uses back gate biasing to increase/lower effective threshold voltage of transistors. Raise threshold to reduce leakage, lower threshold to increase performance but with higher leakage. This approach requires a special triple well process to be very effective, and is unavailable within standard ASIC design flows, plus it increases die size due to distributing/connecting the back gate biasing signals. (5) Core based power gating used in custom IC's. This involves placing large power gating transistors between sections of digital logic and the power supply and/or ground supply within the IC's core area. These large transistors act as switches that turn can turn on or off access to the power supply. Removing access to the power supply greatly reduces the leakage current. These large transistors can restore power to the digital logic sections when they are in active mode.

The discussion of any work, publications, sales, or activity anywhere in this submission, including in any documents submitted with this application, shall not be taken as an admission by the inventors that any such work constitutes prior art. The discussion of any activity, work, or publication herein is not an admission that such activity, work, or publication was known in any particular jurisdiction.

SUMMARY

The present invention, in various embodiments, involves a method and/or device for integrated circuit (IC) core leakage current minimization that allows for easier IC design and incorporation into standard IC libraries and use in programmable devices such as FPGA's or other programmable logic devices. The invention incorporates portions of a leakage current minimization solution into the I/O ring of IC's, which provides a number of advantages as discussed herein. In further embodiments, the invention involves placing multiplexors or selectors in the I/O ring area, to allow for selection and delivery of various VDD level to portions of an I/C core. Thus, according to specific embodiments of the present invention, the present invention provides a method and/or mechanism able to provide flexible and sophisticated power management.

The invention may be used in a variety of applications and situations that require or would benefit from advanced power management in logic design settings. The present invention may also be incorporated into logic description libraries, test systems, simulation systems or descriptions, or other systems or methods related to logic circuit design, emulation, testing or production as will be understood in the art.

A further understanding of the invention can be had from the detailed discussion of specific embodiments and specific circuit designs incorporating aspects of the invention below. For purposes of clarity, this discussion refers to devices, methods, and concepts in terms of specific examples. However, the method of the present invention may operate with a variety of types of devices and equipment and in a variety of applications. It is therefore intended that the invention not be limited except as specifically provided in the attached claims.

Furthermore, it is well known in the art that logic systems, circuits, and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

For the sake of clarity, the invention will be explained herein with respect to specific embodiments, in some cases including specific numbers of such elements as buffers, I/O modules, signal communication lines, or other components. It will be clear from the teachings herein to those of skill in the art that the invention may be deployed in many alternative logic designs. It is inherent in the art that logic devices and processes and circuits can be highly variable in the arrangement and configuration of different components. Described examples should therefore been taken as illustrations and not seen as limiting the invention except as provided in the claims. In order to facilitate description, the following discussion will describe the present invention in terms of particular methods and architectures for providing power management. However, the methods of the present invention are applicable to other logic designs.

Functional aspects of the invention that are implemented on a computer or logic circuitry, as will be understood from the teachings herein, may be implemented or accomplished using any appropriate implementation environment or programming language, such as C, C++, Cobol, Pascal, Java, Java-script, assembly or machine code programming, custom logic circuits and languages for specifying same (RTL, SPICE, etc.) In some embodiments, methods and/or systems described or claimed herein may be wholly incorporated into a programmed information device, either for emulation or usage purposes.

When used herein, "the invention" should be understood to indicate one or more specific embodiments of the invention. Many variations according to the invention will be understood from the teachings herein to those of skill in the art.

All references, publications, patents, and patent applications cited herein are hereby incorporated by reference in their entirety for all purposes.

BRIEF DESCRIPTION OF THE DRAWINGS

FIG. 8 is an example of a core-limited IC design that can have power management functions according to specific embodiments of the invention.

FIG. 9 is an example of a pad-limited IC design that can have power management functions according to specific embodiments of the invention.

DETAILED DESCRIPTION OF SPECIFIC EMBODIMENTS

Overview

Figure 1:
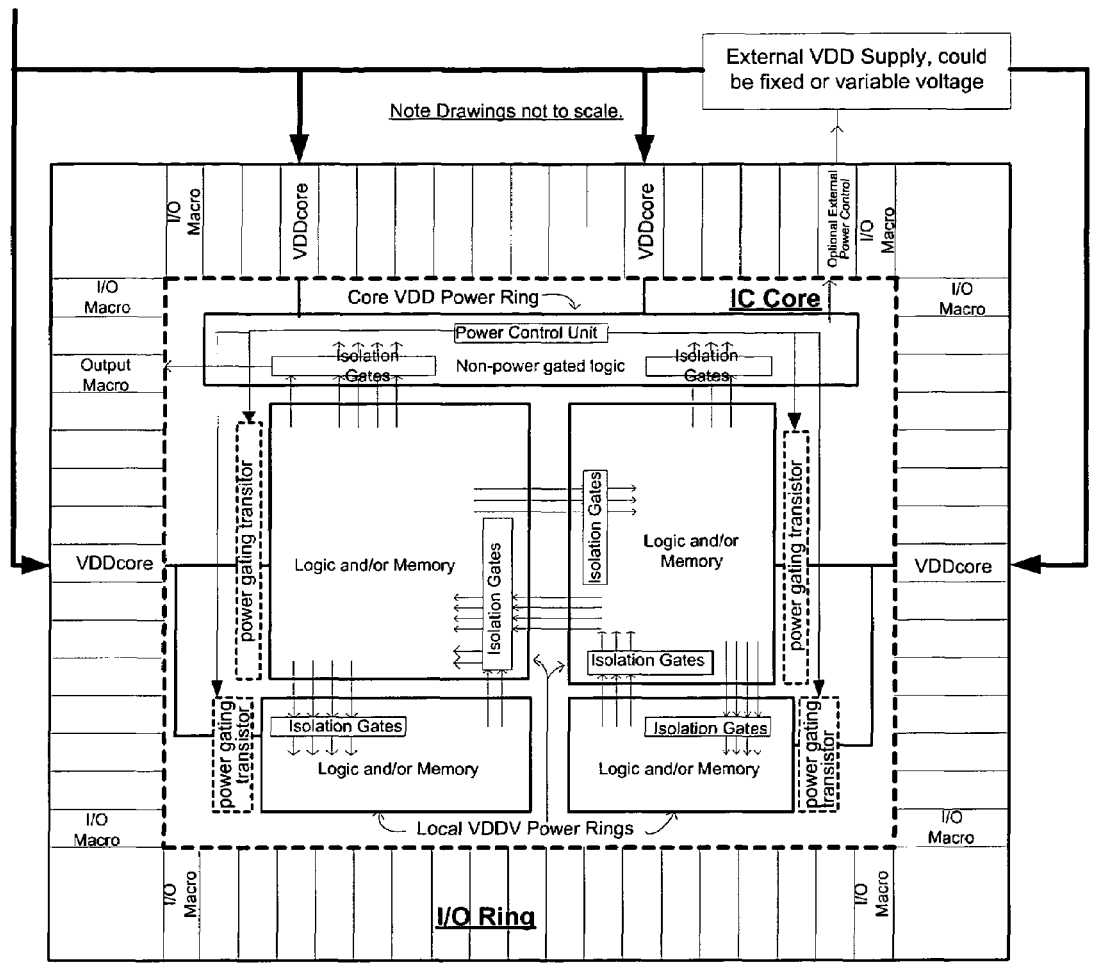
FIG. 1 illustrates an example of a power control scheme used in custom integrated circuit designs.

Power Gating has previously been used to minimize core leakage power consumption within custom integrated Circuits (IC's). Previous power gating techniques have utilized large transistors distributed throughout an IC's core to switch on/off the power supply to core logic sections. This approach results in having stand-alone power gating transistors that occupy valuable IC core area and complicate IC floor planning. For example, four such transistors are shown in FIG. 1. In this and the following figure, the I/C Core is generally the area inside the heavy dashed line, with the I/O ring being the area generally outside this line. Additional metal routing is also required to connect these power gating transistors to the core VDD supply I/O circuits or macros, this metal routing wastes valuable core area, and increases the Current X Resistance (IR) voltage drop coming from the core power supply.

Additionally, a more complex form of power gating involving selecting one of a number of possible power levels for different sections of the IC has also been used. This can add further complexity to IC and core designs.

It should further be noted that custom IC's are hand crafted, and use expensive and time consuming custom (non-standard) design flows that support the addition of power gating transistors to the IC. Furthermore, most custom IC's that utilize power gating transistors, do so in limited areas, and often only to gate a small portion of the IC's core logic. Standard IC design flows and the available standard CAD tools don't support the addition of power gating transistors to IC's.

FIG. 1 shows how IC designs use power-gating transistors within their core areas to reduce leakage current. (Note, that in this and other figures, the term "macro" is used to indicate both or either a logic circuit module or portion of circuit described by a circuit descriptor language, such as RTL or SPICE. This reflects its use in the art, where such modules are typically defined by pre-packaged blocks of RTL or similar descriptor language. As used throughout this description "macro" can indicate either a block of RTL or SPICE or other language descriptor code or a circuit module, whether specified by a circuit descriptor language or not.) The supply voltage often has a fixed value, but it can optionally be varied based upon feedback from the IC to increase or decrease the supply voltage as needed to increase and decrease IC performance.

The VDD supply enters the IC through I/O VDD core power macros, which connect the external VDD power supply to the IC's core. This example shows power-gating transistors that turn on/off VDD going to independent sections of the IC's core. Another section is shown as always active and doesn't use power-gating transistors. Some typical designs can have hundreds of smaller power-gating transistors though for simplicity, the figure illustrates only four core power-gating transistors.

It is a good IC design practice to avoid conditions where a floating signal can drive the gate of a transistor that has active power supplies. In this illustrated example, outputs from a powered down section of the IC's core, which would float when powered down, could drive the gates of transistors in sections of the IC's core that remain powered on. To prevent this problem all output signals coming from any power-gated section should first pass through isolation gate macros that can tolerate floating input signals. FIG. 1 shows isolation gates intercepting potentially floating signals before they can drive active logic. Simple logic gates such as pass gate multiplexors, NOR gates, OR gates, AND gates, NAND gates and so forth can be configured to create isolation gates as is understood in the art. These floating input tolerant macros are used to replace potentially floating signals with digital 1 or 0 signal values. A control signal is needed to insure the potentially floating signals are deselected whenever the section of logic that drives these signals has been powered down. For example, a 2-input NOR gate always produces an output of 0 when one of the inputs is low, so the NOR gate's control input would go low whenever the power-gated logic that drives the NOR gate's other input has been powered down. The NOR gate control signal would go high whenever the power-gated logic has active power so that the potentially floating signal would pass through the NOR gate. An inverter could easily be added to the NOR gate remove the logical inversion that was introduced if desired.

Power control logic, also shown in FIG. 1, is typically needed to power up/down the various power-gated sections of the design, issue the appropriate control signals to the isolation gates, and reset logic sections once they have been powered up. This power control logic is generally not powered down, but remains active so it can wake the power-gated sections of the IC when needed. The power control logic could be located on chip, if it is connected to the non-gated VDD core power supply or off chip depending upon the application and the availability of spare I/O pins for external connection.

Overview of I/O Power Islands

According to specific embodiments, the present invention provides an improved approach to power gating that involves placing the large power gating transistors within the I/O area next to the core VDD supply I/O macros. This has a number of advantages over other approaches, such as:

1.) Minimizes the metal routing required to connect VDD to the power-gating transistors.
2.) Reduces the IR supply drop going to the power gating transistors.
3.) Removes the power gating transistors from the IC's core area reducing die area and cost. (An estimated 3 to 6% area and cost reduction can be expected when compared to placing the power-gating transistors in the IC's core, although the actual area and cost reduction will vary from design to design.)
4.) Only one wide metal route needs to be made for the power hookup.
5.) Reduces power grid noise that can occur when powering up/down large logic blocks. I/O based power gating transistors are connected to dedicated VDD core power macros and these are connected off chip via bond wires or other methods. Thus I/O based power gating transistors are decoupled at the board level, core based power gating transistors can share the same metal routes and VDD core power macros, so they have far less decoupling.

6.) This approach also works well with standard IC CAD tools and design flows unlike previous embodiments that focused on custom designs that utilized custom design flows.

Figure 2:
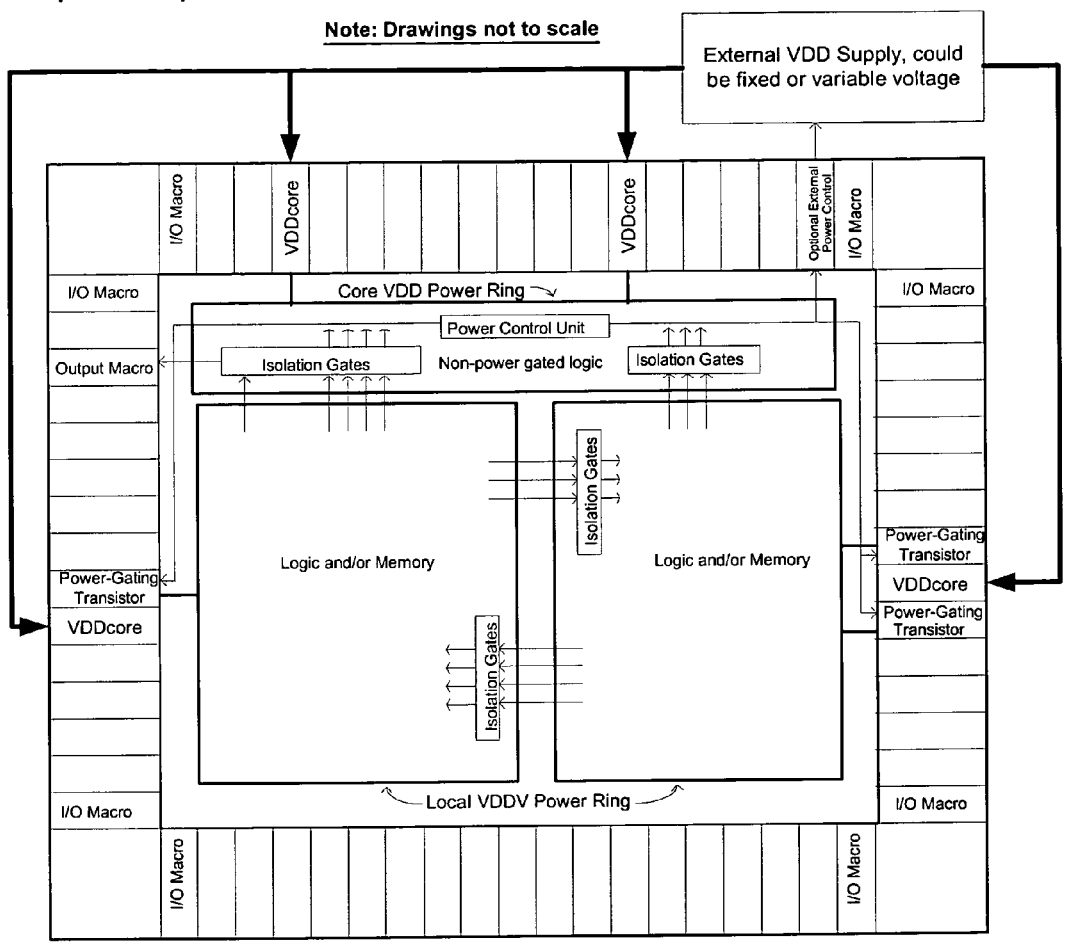
FIG. 2 illustrates an example of a power control scheme using I/O ring power transistors to create power islands in integrated circuit designs according to specific embodiments of the invention.

FIG. 2 illustrates improvements in IC design according to specific embodiments of the invention when the power gating transistors are moved into the I/O area. For example, moving the power-gating transistors from the core area to the I/O area greatly improves the overall design implementation. In specific embodiments, the invention differs from the current art because the connections between nearby macros within the I/O area are far better for carrying large currents associated with power supplies than the connections from an I/O core supply macro to and IC's core. Power gating involves large currents, which can cause substantial voltage drops if the current times resistance is substantial. The resistance of metal used for routing IC's decreases as the metal becomes wider, thus wide metal routing is preferred for connecting power and ground signals to help minimize potential voltage drops.

Figure 3:
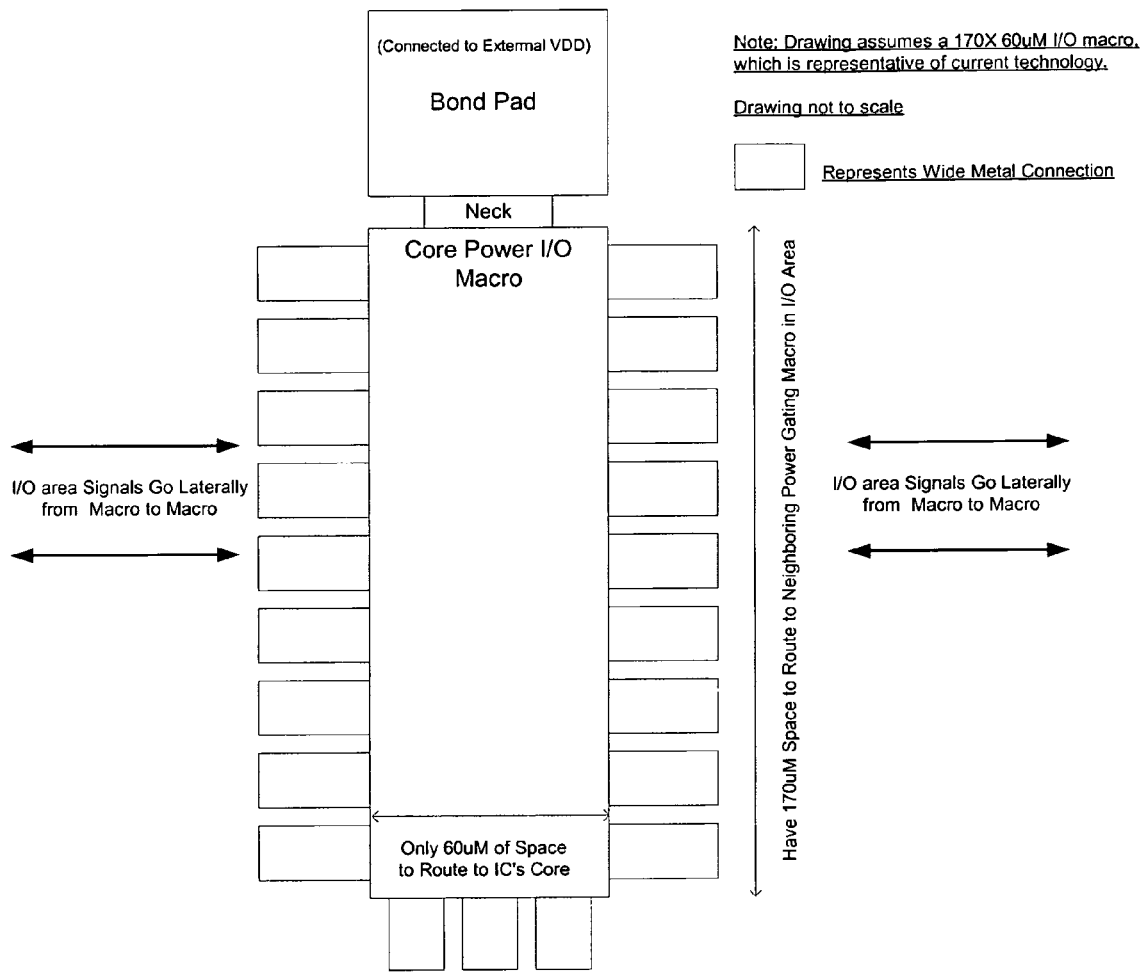
FIG. 3 illustrates an example of a power (VDD) core supply I/O macro (or circuit module) suitable for placement in an I/O ring of an IC that can be used in integrated circuit designs according to specific embodiments of the invention.

Typical I/O circuit design macros utilize long and narrow layout formats, as shown in the example diagram of a VDD Core Supply I/O Macro provided in FIG. 3. In this figure, the external bond pad is at the top, abutments are on each side to other macros, and signals to core at bottom. The long sides of the I/O macros are commonly abutted against neighboring I/O macros within the I/O area and signals are passed laterally from I/O macro to I/O macro. The two narrow sides of I/O macros are typically connected to the bond pad and to the core of the IC. Most VDD core power supply macros can provide far wider lateral metal connections to power-gating transistors located nearby within the I/O area than they can provide to power-gating transistors located nearby in the core area because of the long narrow format of the I/O macros. Furthermore connections to large power gating transistors typically have more efficient layouts when the supply and gate connection layers are at right angles to the output connection layer, and this improvement easier achieved in the I/O area as opposed to the core of the IC. Lastly, large power gating transistors can be located on both sides of the I/O supply macros in the I/O area providing a method to easily double the amount of lateral metal connection width.

In contrast, the I/O core power supply macro only has one narrow side facing the core of the IC that is far smaller. Once all the output connection layers have been used, there is no simple way to double the potential metal connection width going to the power gating transistors. Moving the power-gating transistors from the IC's core to the I/O area provides a significant improvement over the current art of putting the power-gating transistors in the IC's core due to the ability to use wider metal connections that would have lower resistances. The mechanisms used for I/O signal routing and core signal routing differ greatly, and these differences are exploited when placing the power-gating transistors in the I/O area. I/O areas generally use lateral abutment based routing, where signals usually do not cross over each other, to pass signals from macro to macro. This is good for routing a small number of signals with wide metal routes. Core based signal routing in IC's involves point-to-point connections using an X Y grid and multiple metal layers. This supports routing millions of potential signal connections, but is poor for routing wide metal.

IC's often have multiple metal layers for connecting signals and the Power and ground connections to the IC's core typically use multiple layers. Given the capacity for wide metal connections from the VDD supply macro to a nearby I/O macro, only one metal layer would be needed to shunt VDD to supply a nearby I/O area power-gating transistor. Multiple layers could then be used to connect the power gating transistor virtual VDD output (VDDV) from the power-gating transistor to the IC's core to help minimize voltage drop.

I/O Macro Architecture Overview

Most IC's have I/O macros that contain transistors that are tied to the I/O interface's VDD and VSS supplies as well as transistors that are tied to the core's VDD and VSS supplies. These supplies are typically distributed as concentric metal rings around the IC above the I/O macro transistors. The I/O VDD supply typically uses a higher voltage than the core VDD supply thus level shifters are typically used to pass signals between these 2 sets of supplies.

Figure 4:
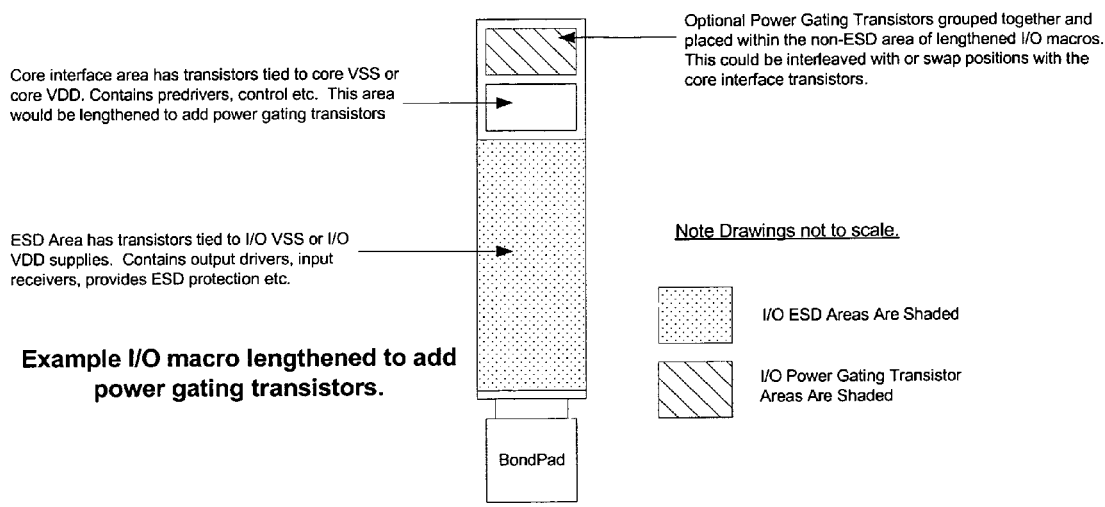
FIG. 4 is an example illustrating adding power gating transistors to the pad ring along side of the VDD core supply macro, which results in increasing the size of the pad ring for pad limited designs, according to specific embodiments of the invention.

In order to minimize layout area usage, transistors tied to a common supply are physically grouped together within the layout. A typical I/O macro would have two transistor areas near the I/O bond pads supplied by I/O VDD and I/O VSS that are tied to PMOS and NMOS I/O level transistors and their well region(s) respectively. I/O areas near the core of the IC are supplied by core VDD and VSS, these would be tied to PMOS and NMOS core level transistors and their well region(s) respectively. FIG. 4 is an example illustrating adding power gating transistors to the pad ring along side of the VDD core supply macro, which results in increasing the size of the pad ring for pad limited designs, according to specific embodiments of the invention. The I/O interface normally requires ESD (electrostatic discharge) protection to handle potentially damaging external static voltages that could reach the I/O interface via the package and bond wire connections. Most I/O macros regardless of function contain MOSFET protection diodes that are configured to shunt excessive negative voltages to the VSS I/O supply and excessive positive voltages to the VDD I/O supply. During normal operation these MOSFET diodes serve double duty and act as the output driver transistors for their respective output macros. The ESD protection circuitry is relatively large and usually occupies more than 70% of the available area within most I/O macros, additional I/O transistor area is occupied by: pre-buffer drivers, input buffers, level shifters and so forth. The core interface area containing the core level pre-buffers, drivers, and control for bidirectional I/O's are within the core VDD and core VSS supplied areas of the I/O macros and these are relatively small. From a high level perspective the I/O related transistors occupy a separate area that provides the ESD and I/O interface functions. The core related transistors occupy a 2nd separate area that provides the core interface and control functions. Assuming the I/O macros are lengthened to contain sets of power gating transistors, these power gating transistors would occupy a 3rd separate area and provide a $3^{rd}$ I/O macro function.

Layout Overview of Power Gating Transistors in I/O Area

Figure 5:
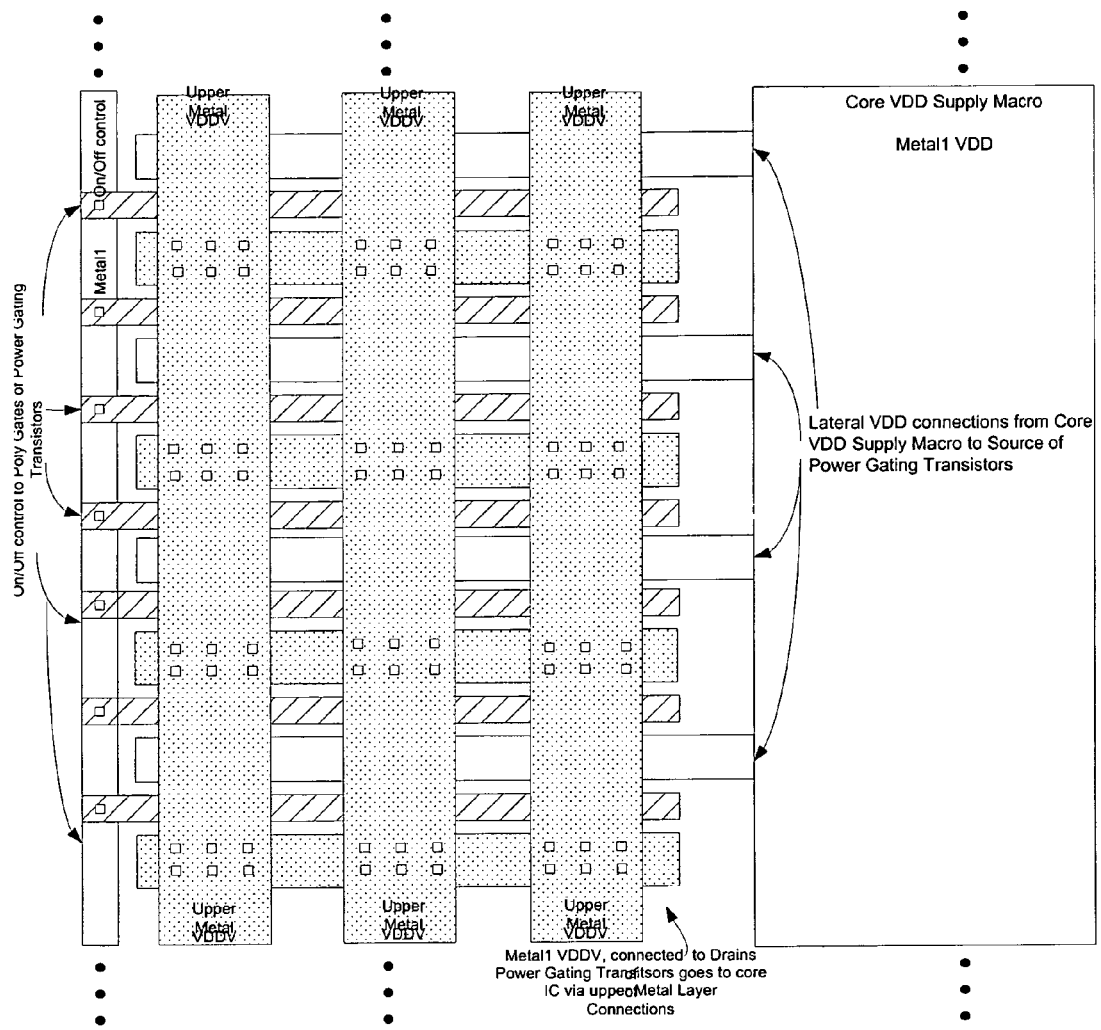
FIG. 5 illustrates an example of a layout overview for a circuit including power gating transistors in an I/O area according to specific embodiments of the invention.

FIG. 5 illustrates an example of a layout overview for a circuit including power gating transistors in an I/O area according to specific embodiments of the invention. In this figure, the upper metal lines are the output, the clear lines from the left are the input supply, the diagonally slashed lines are the gates, and the core supply is the supply power supply. According to specific embodiments, implementations of I/O area power gating transistors utilize macros whose height matches the height (long sides) of the neighboring macros placed in the I/O area. Depending upon the process and the height of the I/O macros there generally should be enough space to fit 50 to 250 parallel power-gating transistors within an I/O macro footprint. A special case implementation involves making standard I/O macros taller to provide room to add power gating transistors within them. This could cause a potential height mismatch with neighboring I/O macros that don't contain power-gating transistors. Alternative embodiment solutions for pad limited designs are discussed below.

In general, the I/O areas of core limited IC's are underutilized, thus large power gating transistors can often be placed within the I/O area without increasing the net die area. Extra tall narrow I/O macros that use staggered bond pads are frequently available, and these can also be used to provide extra I/O macro slots for adding power gating transistors to the I/O area. The virtual VDD signal, called VDDV, provided by the power gating transistor can then be connected from the I/O area to the IC's core much like the connection of a standard VDD signal to the IC's core using standard CAD tools and a standard design flow. Furthermore, the VDDV signal can also be connected to the core power supply ring in the I/O area, so it could be used to reduce leakage current due to transistors that are tied to the core power supply that are often inside the I/O macros. Design embodiments without spare I/O areas are discussed in the section describing alternative solutions for pad limited designs.

Functional Embodiments

Figure 6:
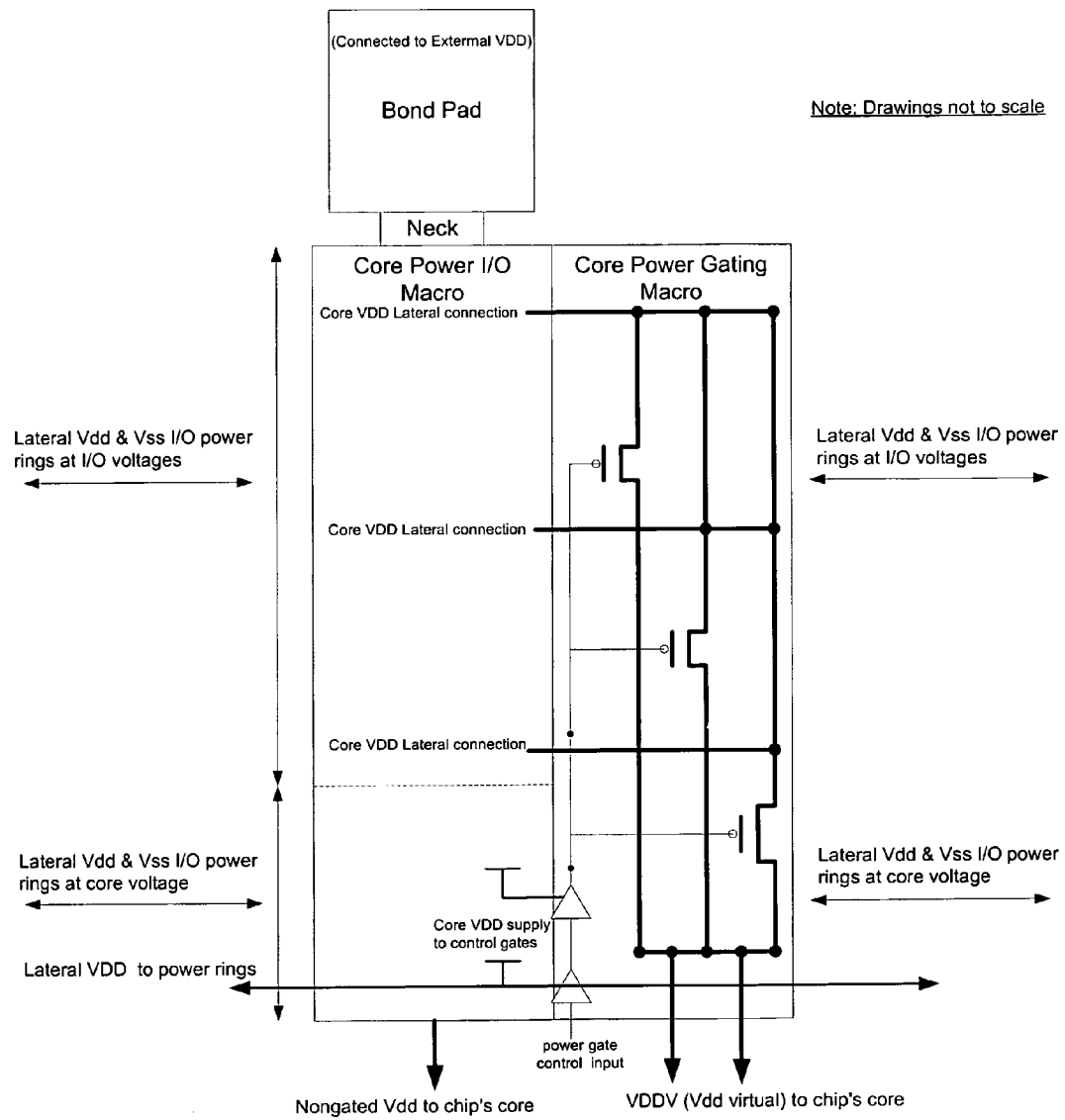
FIG. 6 is an example functional transistor diagram of a power gating macro/module having three large parallel power gating transistors driving two VDDV (VDD virtual) power connections to a circuit core according to specific embodiments of the invention.

Many different embodiments are possible, and the invention is not limited to the specific embodiments discussed below: other variations will be apparent to one skilled in the art. FIG. 6 is an example functional transistor diagram of a power gating macro/module having three large parallel power gating transistors driving two VDDV (VDD virtual) power connections to a circuit core according to specific embodiments of the invention. This diagram only depicts three power-gating transistors to help improve readability. The size and number of parallel power gating transistors and the number of connections to the core will vary in actual implementations. This example implementation requires a single well buffered power control input that controls (turns on/off) all of the VDDV connections going from the power gating transistors to the IC's core. A different approach could have multiple independent power gate control inputs controlling multiple non-parallel gated VDD connections to the core that supply smaller power zones. The VDD core I/O macro in this implementation provides a non-gated VDD connection only to the IC's core and supplies VDD to the core voltage power rings located in the I/O area.

Figure 7:
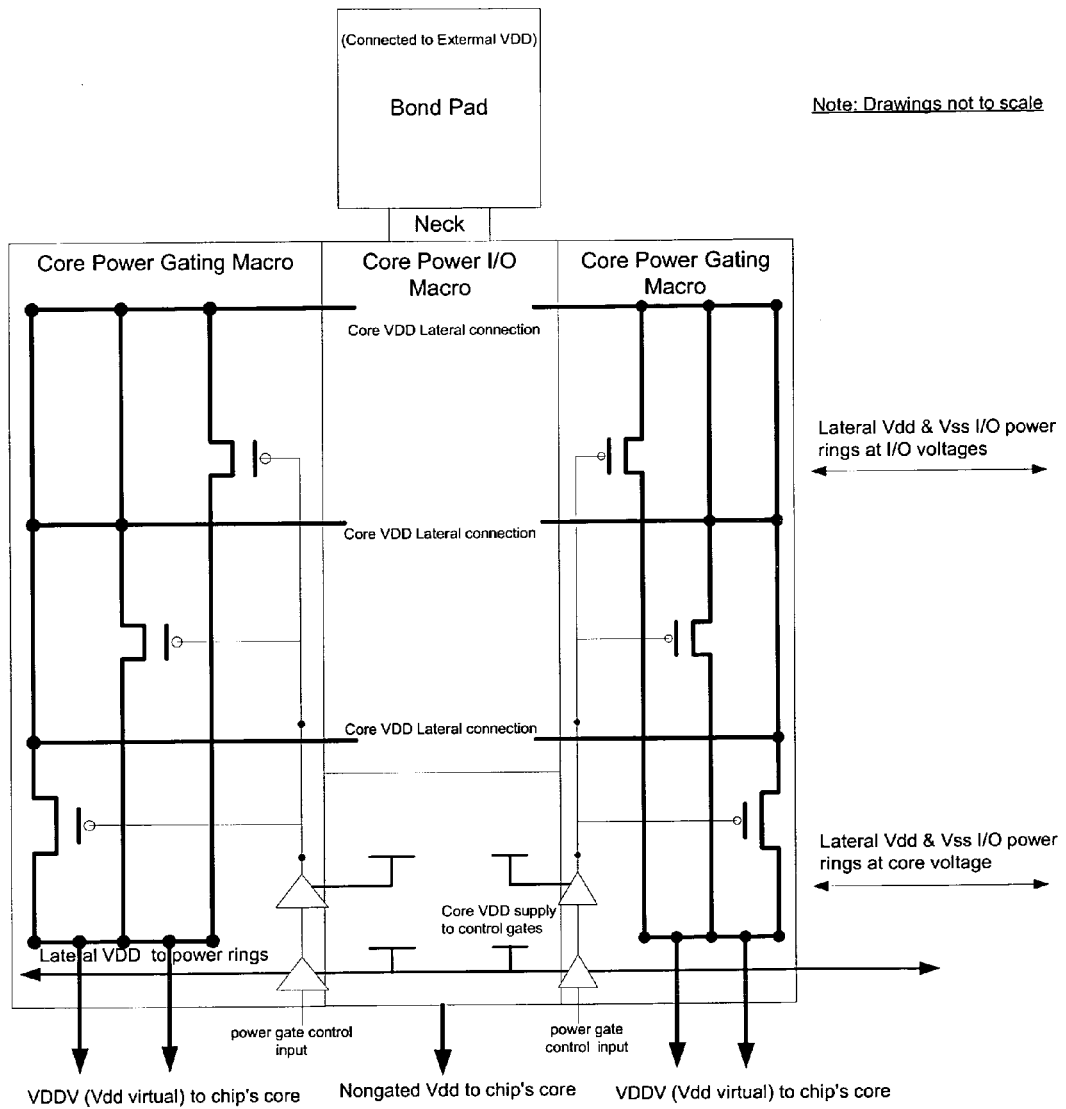
FIG. 7 an example functional transistor diagram of a power gating macro/module having sets of power gating transistors on each side of a VDD core supply according to specific embodiments of the invention.

FIG. 7 an example functional transistor diagram of a power gating macro/module having sets of power gating transistors on each side of a VDD core supply according to specific embodiments of the invention. This embodiment involves placing sets of power gating transistors on each side of a VDD core supply macron that can share or use independent power gate control signals. A different embodiment has multiple independent power gate control inputs that control multiple non-parallel gated VDD connections to the IC's core. The VDD core I/O macros in some embodiments can continue to provide standard VDD connections to the IC's core to supply non-power gated logic, while other VDD core supply macro embodiments could be made without providing the standard VDD supply connection to the IC's core.

Another implementation would provide each power gating transistor macro with separate VDDV outputs, instead of combining them into a common output. Also if four power-gating transistor macros were implemented they could be paired to provide 2 independent VDDV of outputs. Other variations will be apparent to one skilled in the art. When internal power sequencing isn't required the preferred approach is to combine all transistors and outputs as shown. When each output has separate controls or internal power sequencing is needed then the best approach is for each VDDV output to have it's own independent transistor(s).

The VDDV supply generally should not be shorted directly to VDD since VDDV and VDD are at slightly different voltages when VDDV is in an active state and at completely different voltage levels when VDDV is in the power down state. An IC according to specific embodiments of the invention can have any number of independently controlled VDDV core power supplies that are routed via separate VDDV rings that provide independent supplies to sub-modules that are in separate areas within an IC. These separate VDDV supplies generally should not be shorted together. If one VDDV supply is powered up and it is inadvertently connected to another VDDV supply that remains inactive, the active supply will attempt both VDDV power zones. The supposedly inactive powered down zone, would be effectively powered up causing excess current leakage.

To improve readability the figures provided in this document have not shown the VSS power rings. In theory the various core logic modules having separate VDDV supplies could share the same VSS power rings. In practice there may be large IR voltage spikes on shared VSS power rings when powering up/down a large logic areas. These IR voltage spikes can impact functionality of active logic blocks sharing the same VSS power rings, thus in some embodiments, circuit designers may chose to run simulations to insure these potential IR voltage spikes will not cause problems if using shared VSS rings.

Implementation of Specific Example Embodiments

The power-gating transistors can be implemented as standardized library macros that can abut or be close to one side or both sides of the VDD core power macros. Other I/O macros generally should not be placed between the VDD core supply I/O macro and their corresponding power gating transistor macros. A single standard library macro that contains both the VDD core power macro and the power-gating transistors can also be created as well as a higher supply capacity macro with a VDD core power macro and power-gating transistors on both sides. Implementing the power gating-transistors as stand alone library macros or as macros that include the VDD core supply I/O's may help streamline the design process and support use of standard CAD tools and standard design flows. It is recommended that a standalone power-gating macro should occupy the same layout footprint, or occupy a layout footprint that is an integer multiple of the width, of a VDD core power supply macro. This will further streamline the design process and sets fixed sizes for the layouts of the I/O power-gating transistor macros.

The optimum size or net channel width of I/O based power-gating transistors generally depends upon one or more of: process technology, targeted core supply voltage, package inductance, package resistance, largest dynamically switching load (usually the final stage of a clock tree), RC skew of largest load, the acceptable reduction in logic performance due to power gating and so forth. It is beyond the scope of this invention document to provide detailed modeling and simulation instructions; these are available in existing technical literature. A preferred design practice is to have the power gating transistor I/O macros contain their high drive control gate transistors, plus the maximum size and number of parallel power gating transistors that would fit within an I/O macro area. For example, a 170 uM×60 uM I/O macro should be able to contain a set of parallel power gating transistors with approximately 5 to 10,000 uM of net channel width in a 0.18 uM process.

Once the net size of the power-gating transistor has been defined, it generally is characterized via SPICE simulations to determine the maximum clock tree and subsequent loading that it can supply within the acceptable performance goals of the particular application. A good practice is to compare simulations showing clock tree performance with and without the power gating transistors in the circuit. The results of these simulations can be distilled down to a design specific rule that describes the number flip flops plus expected loading that can be driven by a power gating transistor I/O macro while still maintaining acceptable timing. The designer should then insure that there are enough power gating transistor I/O macros in the I/O area to supply the maximum number of simultaneously switching flip flops and their loads within each VDDV power zone.

Solutions for Pad Limited Designs

IC die area is usually determined by either the size of the core area or by the inner perimeter of the I/O area. IC's in which the core area determines die size are at times referred to as core-limited. These IC's have fully utilized core areas and spare space in their I/O area. Thus if more logic or memory was added to the core area the net die area would increase, but if more I/O macros were added to the I/O area these could consume spare I/O area space and the die size would remain unchanged. IC's in which the inner perimeter of the I/O area determines the die size are called pad-limited. Thus if more I/O macros were added to the I/O area, the I/O perimeter would have to grow and net die area would increase. In contrast if more circuitry were added to the core area of a pad-limited design, the die size would remain the same. Some IC's are simultaneously pad limited and core limited, a blend of approaches for adding power-gating transistors could be used for these cases. FIG. 8 is an example of a core-limited IC design that can have power management functions according to specific embodiments of the invention. FIG. 9 is an example of a pad-limited IC design that can have power management functions according to specific embodiments of the invention.

Figure 10:
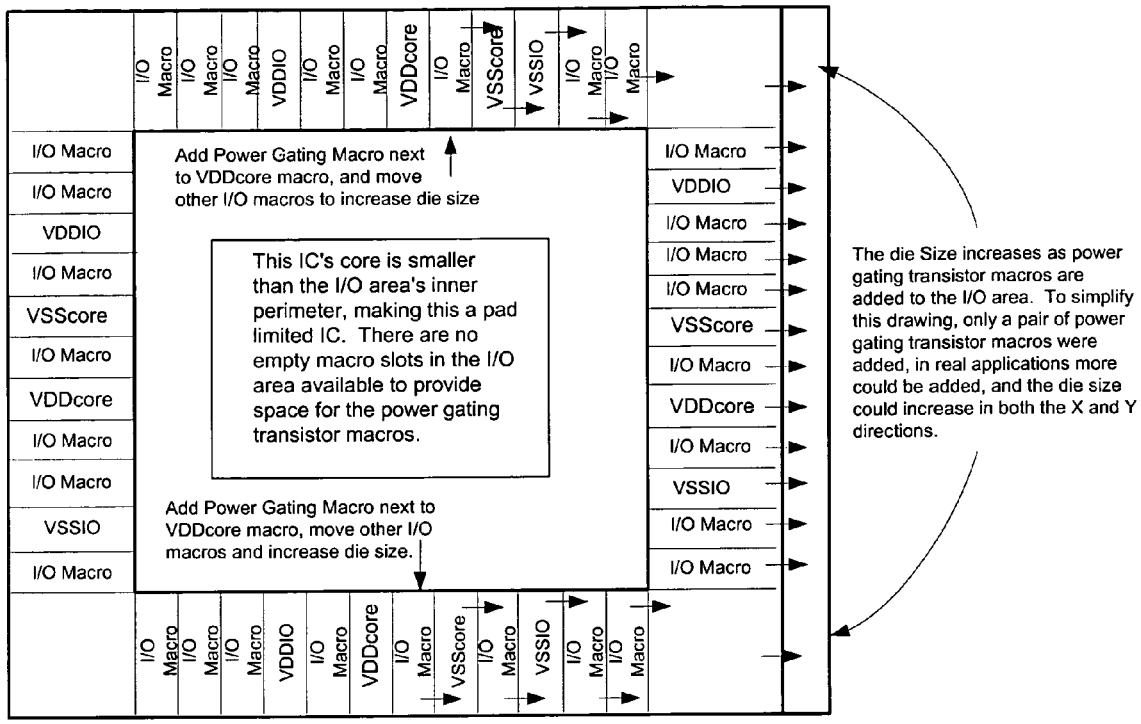
FIG. 10 is an example of adding a non-layout optimized power gating transistor macro to the I/O area of a pad-limited design according to specific embodiments of the invention.
Figure 11:
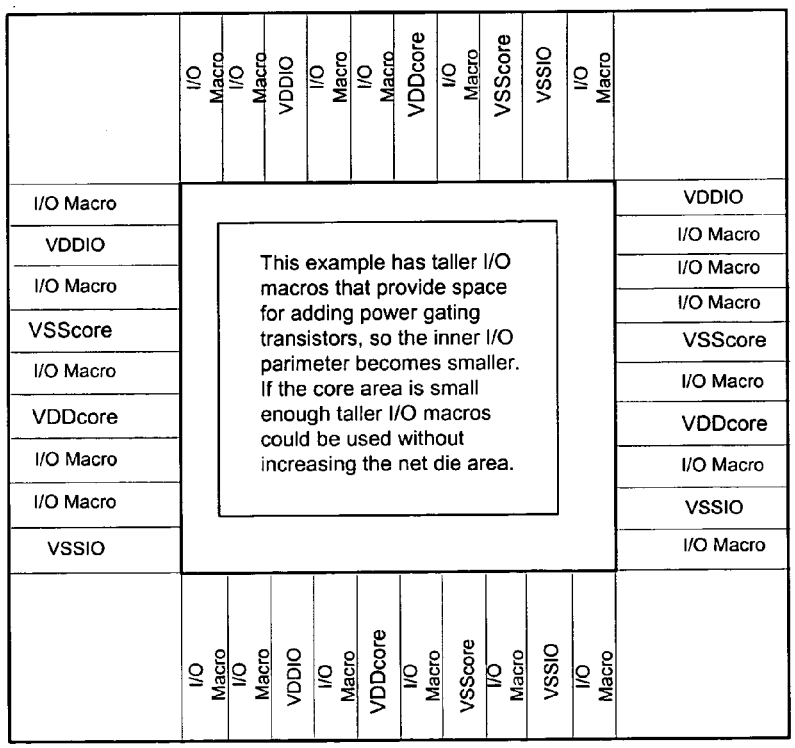
FIG. 11 is an example of a core-limited IC design using taller I/O macros according to specific embodiments of the invention.

Adding power gating transistor macros to the I/O area of core limited designs generally has no impact on the die area for core limited designs because these additional macros could fit within existing spare space in the I/O area. Adding power gating transistors to the pad limited designs is more problematic. The I/O area perimeter size would need to increase enough to fit in the power gating transistor macros, and thus the die size would increase unless efforts are made to minimize this effect. FIG. 10 is an example of adding a non-layout optimized power gating transistor macro to the I/O area of a pad-limited design according to specific embodiments of the invention. FIG. 11 is an example of a core-limited IC design using taller I/O macros according to specific embodiments of the invention.

Figure 12:
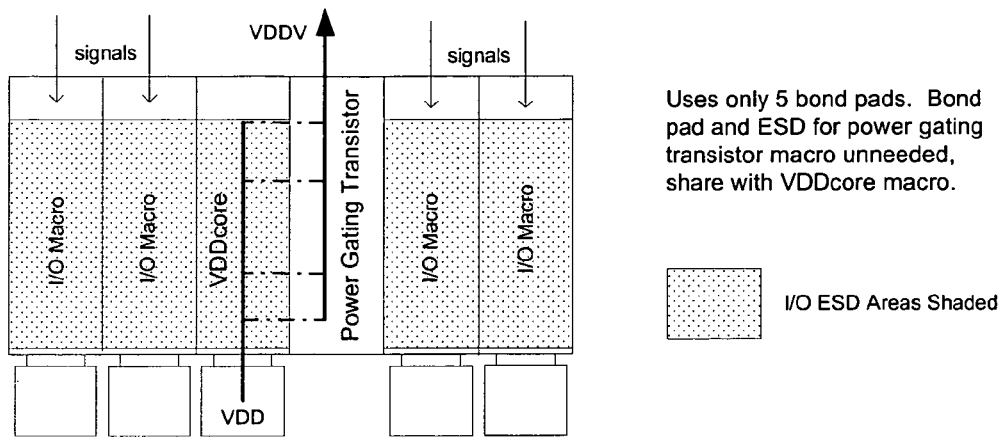
FIG. 12 is an example illustrating adding power gating transistors to the pad ring along side of the VDD core supply macro, which results in increasing the size of the pad ring for pad limited designs, according to specific embodiments of the invention.

Adding Power Gating Transistors in Pad Limited Designs:

The preferred power gating transistor embodiments involve minimizing area increases when adding power gating transistor macros to the I/O areas of pad-limited design. FIG. 12 is an example illustrating adding power gating transistors to the pad ring along side of the VDD core supply macro, which results in increasing the size of the pad ring for pad limited designs, according to specific embodiments of the invention. This is more appropriate for core limited designs according to specific embodiments of the invention. For pad limited designs, one or more of the following three embodiments can be used to add power-gating transistors to the IC while minimizing the net die area increase.

Approach I:

One embodiment involves adding power gating transistors to the I/O macros, which makes them taller, which is preferred for designs with ample spare core area, and example of which is shown in FIG. 11. The added power gating transistors are preferably distributed within a sufficient number of adjoining I/O macros, to maintain fairly uniform I/O macro heights and minimize deep I/O macro encroachments into the core area. Different applications will require different net power gating transistor sizes to meet their targeted drive strength and leakage current limitations.

The following techniques can be used in specific embodiments to add power-gating transistors to the I/O area macros by increasing their height:

1) Custom layout edits to add power-gating transistors to I/O macros. Custom layout edits to create taller VDD supply macros needed to connect/supply VDD to the I/O power-gating transistors via lateral abutment based connections of matching VDD ports.

2) Compiler modifications or additions that automatically add power-gating transistors to the I/O macros and generate a matching VDD core supply macro, based upon user-defined inputs. The result is similar to the above, but would provide a faster and easier route to adding power gating transistors using a modified or created compiler according to specific embodiments of the invention. Modifying I/O macros in a circuit compiler would be a straightforward task to a person of ordinary skill in the art having the benefits of the teachings provided herein.

3) Abutting fixed size power gating transistor extension macros to the core sides of I/O macros and/or abutting matching fixed size VDD core supply extension macros to the VDD core supply I/O macros. The power gating transistor I/O extension macros and the VDD core supply I/O extension macros are connected via lateral abutment based connections of matching VDD ports.

4) A more flexible approach to add power gating transistors and the VDD core supply extension macros uses modular slice based macros that can be connected in parallel. This results in stacking N macros of depth D to the ends of I/O macros, plus stacking N matching macros of depth D to the ends core VDD supply macros and having their VDD ports connected by abutment. (See FIG. 13).

In general, the VDD core power macros supplying the power-gating transistors extend into the core and provide wide enough lateral VDD power hookups to supply the power gating transistors that reside in neighboring I/O macros. The input, output, and control signals to the I/O generally need to be connected to ports that interface with the core of the chip. The power gating transistor on/off control signal and buffering generally are included in any of these embodiments, but specific layout implementations vary with different applications. Different implementations can use different metal layers to interleave the wide metal routes for the VDD core or VDDV core supplies with the wide routes of the VSS core supply signals that may be provided by neighboring I/O macros.

Figure 13:
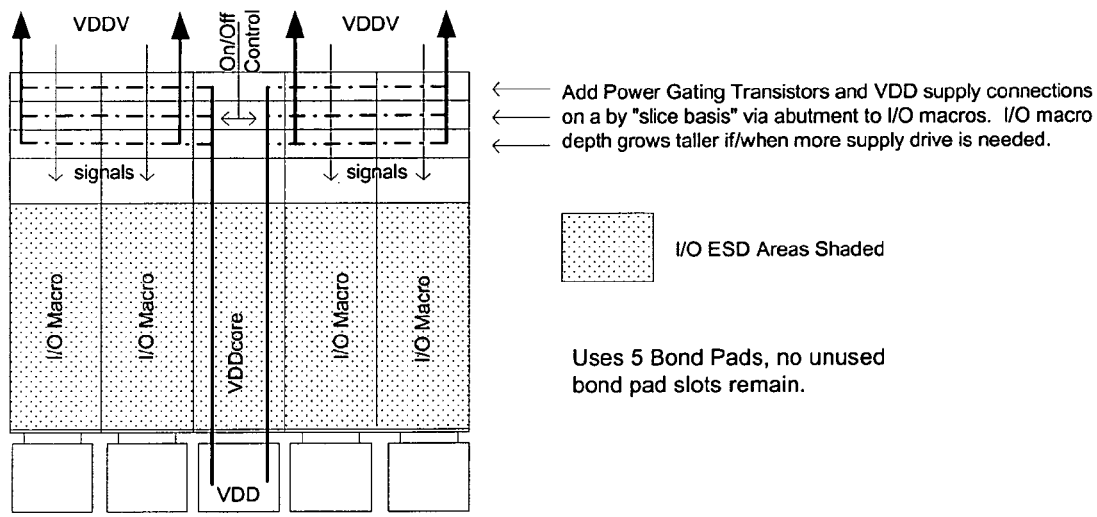
FIG. 13 is an example illustrating adding power gating transistors to the pad ring along side of the VDD core supply macro, which results in increasing the size of the pad ring for pad limited designs, according to specific embodiments of the invention.

To minimize layout area the power gating transistors in specific embodiments can share existing N-type wells containing PMOS transistors that are tied to existing Core VDD power supply rings within the I/O area. In some configurations, macros may have varying heights. For example, standard height macros would be used to supply non-power gated areas of the IC, somewhat taller macros would provide lower drive VDDV supplies to smaller power gated areas of the IC, and extra tall macros would provide higher drive VDDV supplies to large power gated areas of the IC. FIG. 13 is an example illustrating adding power gating transistors to the pad ring along side of the VDD core supply macro, which results in increasing the size of the pad ring for pad limited designs, according to specific embodiments of the invention. In practice the number of lengthened I/O macros that are used to add the power-gating transistors could vary greatly from application to application. It is a good design practice to help minimize die area consumption by using height matching I/O macros on the different sides of the IC since any extra area above the shorter I/O macros would be difficult to utilize effectively.

In specific embodiments, generally the I/O macros should be lengthened to include their power gating transistors before any core based routing occurs since the I/O area's inner perimeter is used as the starting reference point for core area placement and routing by contemporary EDA tools. Abutting matching power gating transistor macros to the I/O macros to increase their heights differs from using core based routing to hookup stand-alone power gating transistors located in an IC's core area. Connections made by abutment, involve placing the outside edges of 2 macros against each other so that matching signals and matching ports touch and are connected together without any external macro-to-macro routing. In contrast core based routing is XY grid based and by definition involves some external macro to macro routing, core routing is more appropriate for connecting complex logic functions rather than power gating transistors. Large power gating transistor embodiments would typically be based upon connecting many smaller power gating transistors in parallel, this approach provides the basis for having repetitive layout blocks with simple interconnections that are ideal for slice based abutment connections, and would result in having near 100% area utilization. This near 100% area utilization would exceed the area utilizations achieved when routing to stand alone power gating transistors in the core of an IC. Furthermore, embedding the power gating transistors in the I/O area reduces netlist complexity and helps streamline the design process. Some further background information about I/O macro architectures is provided elsewhere in this document and is well known in the art.

Approach II

Figure 14:
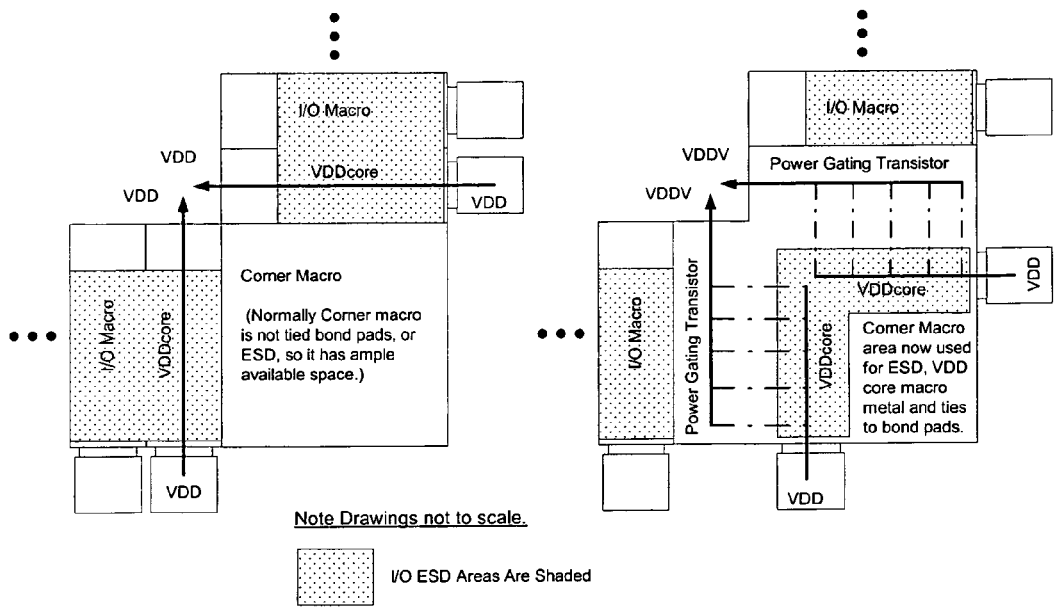
FIG. 14 is an example illustrating adding power gating transistors to the pad ring along side of the VDD core supply macro, which results in increasing the size of the pad ring for pad limited designs, according to specific embodiments of the invention.

A further embodiment involves abutting one or two VDD core supply macros against the corner I/O macro, and repacking their combined layout to place the power gating transistors within the VDD core supply macro area(s), while moving the VDD core supply macro's bond pad, metal structures and ESD protection circuitry into the corner I/O macro. FIG. 14 is an example illustrating adding power gating transistors to the pad ring along side of the VDD core supply macro, which results in increasing the size of the pad ring for pad limited designs, according to specific embodiments of the invention. Corner macros are large and (normally) underutilized so they have ample spare non-ESD. This approach provides the preferred area efficient embodiment for adding power-gating transistors to simultaneously core and pad limited designs. The parasitic inductance values associated with bond pads in corner regions were often excessive in earlier IC packages. It is a good design practice to avoid switching large currents through large parasitic inductances since this results in a large voltage drop. It follows that designers should use packages having low enough corner area inductances to support proper functionality when using this approach. This example provides a representative embodiment other layout permutations would be self evident to someone skilled in the art.

Approach III

Figure 15:
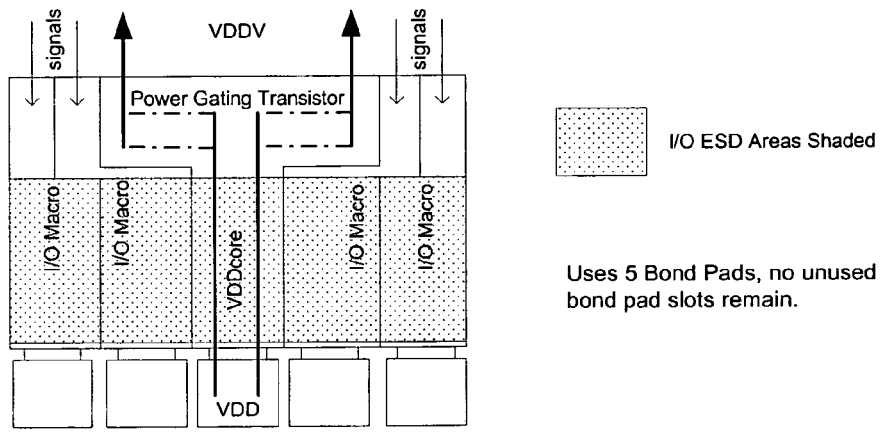
FIG. 15 is an example illustrating adding power gating transistors to the pad ring along side of the VDD core supply macro, which results in increasing the size of the pad ring for pad limited designs, according to specific embodiments of the invention.

A further embodiment involves utilizing combo macros to optimize the layout and pack the power gating transistors into spare space that may exist within the non-ESD areas of I/O macros. FIG. 12 shows the five I/O macros plus a power-gating transistor taking up six I/O macro slots. This combination only uses 5 I/O bond pads, which implies that the I/O pads themselves aren't limiting the minimum size of this configuration so the layout can be further optimized. In this example, if a customized layout could be generated that fits the contents of the power gating transistor and the other 5 macros into 5 pad slots, it would prevent an increase in net I/O perimeter and die area when working with pad limited IC's. All I/O macros connected off chip generally require ESD protection, which often fills up a large portion of the available I/O macro area and may render this approach unworkable. Assuming the layout could be optimized within the non-ESD portion of combo I/O macros to pack in the power gating transistors, small I/O macros that use say low drive 2 mA or 4 mA output drivers would be more suitable for this purpose since they use smaller pre-driver transistors located in the non-ESD area, an example of which is shown in FIG. 15. If ample spare space is available this approach results in no net increase in I/O area size and die size, but there is a trade off of having to use low drive output macros rather than using higher drive output macros. Fortunately most ICs have some signals that can use low drive outputs, especially those that will go into battery powered applications where power consumption and leakage current are often minimized. This combo macro approach could also be implemented with input I/O macros, assuming sufficient spare space is available in their non-ESD area. An IC could also use a mix of combo macros that provide low drive output and input I/O macros. FIG. 15 shows the power gating transistors being distributed to the left and right of the VDD supply input so they could utilize spare space provided by output macros shown in the example combo macro, other layout configurations are also possible.

Solutions for Simultaneously Core Limited and Pad Limited Designs

Many IC's are simultaneously core limited and pad limited, and these only have spare area in their corner macros. In this case if the corner macros don't provide enough space for the adding power gating transistors the die size would have to increase when adding power-gating transistors to the I/O area. A combination of the above core-limited and pad-limited approaches can be employed to add power-gating transistors to the I/O area while minimizing the net die area increase.

Enhancements to Further Reduce Leakage Currents

Figure 16:
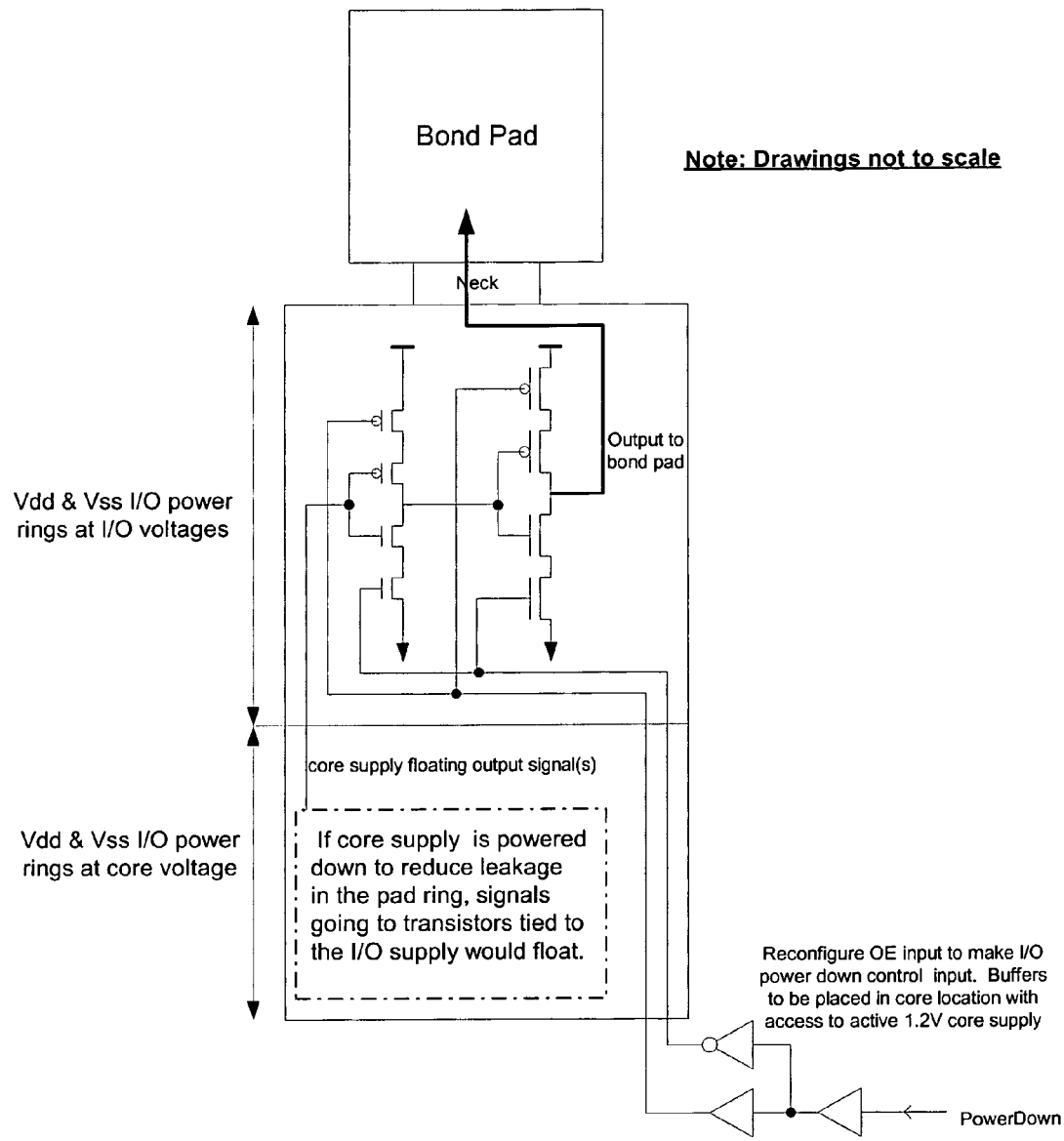
FIG. 16 is an example illustrating adding power gating transistors to the pad ring along side of the VDD core supply macro, which results in increasing the size of the pad ring for pad limited designs, according to specific embodiments of the invention.

The VDDV supply from the power gating cell could also be tied to the core supply power rings located in the I/O area and thus power down the core supplied portions of the I/O macros and further reduce leakage current. This is an optional enhancement to specific embodiments described herein. An example of an enhanced I/O macro that can handle potentially floating signals coming from the powered down core VDDV power supply section is illustrated in FIG. 16. This design enhancement involves connecting the output driver stage and the output pre-driver stage(s) to series VSS and VDD supply gating transistors. These VSS and VDD supply gating transistors are normally placed only on the output driver stage to provide a floating or Z-state output level. Similar VSS and VDD supply-gating transistors would be used to isolate other transistors using the I/O power supplies that could be driven by potentially floating signals from the core supply section of the I/O macro. This approach effectively powers down all transistors tied to the I/O supplies, whenever the VDDV supply has been powered down, thus producing power gating tolerant I/O macros.

A different approach to making Power Gating Tolerant I/O macros involves using pass gate multiplexors to deselect potentially floating signals going to the I/O supplied section of the macro from the powered down core section of the I/O macro. The control signals going to these pass gate multiplexors would select hard 0 or 1 outputs rather than have the floating signals drive the I/O power supplied section of the macro. This approach would also result in having I/O's with higher drive strengths than those illustrated in FIG. 16.

Figure 17:
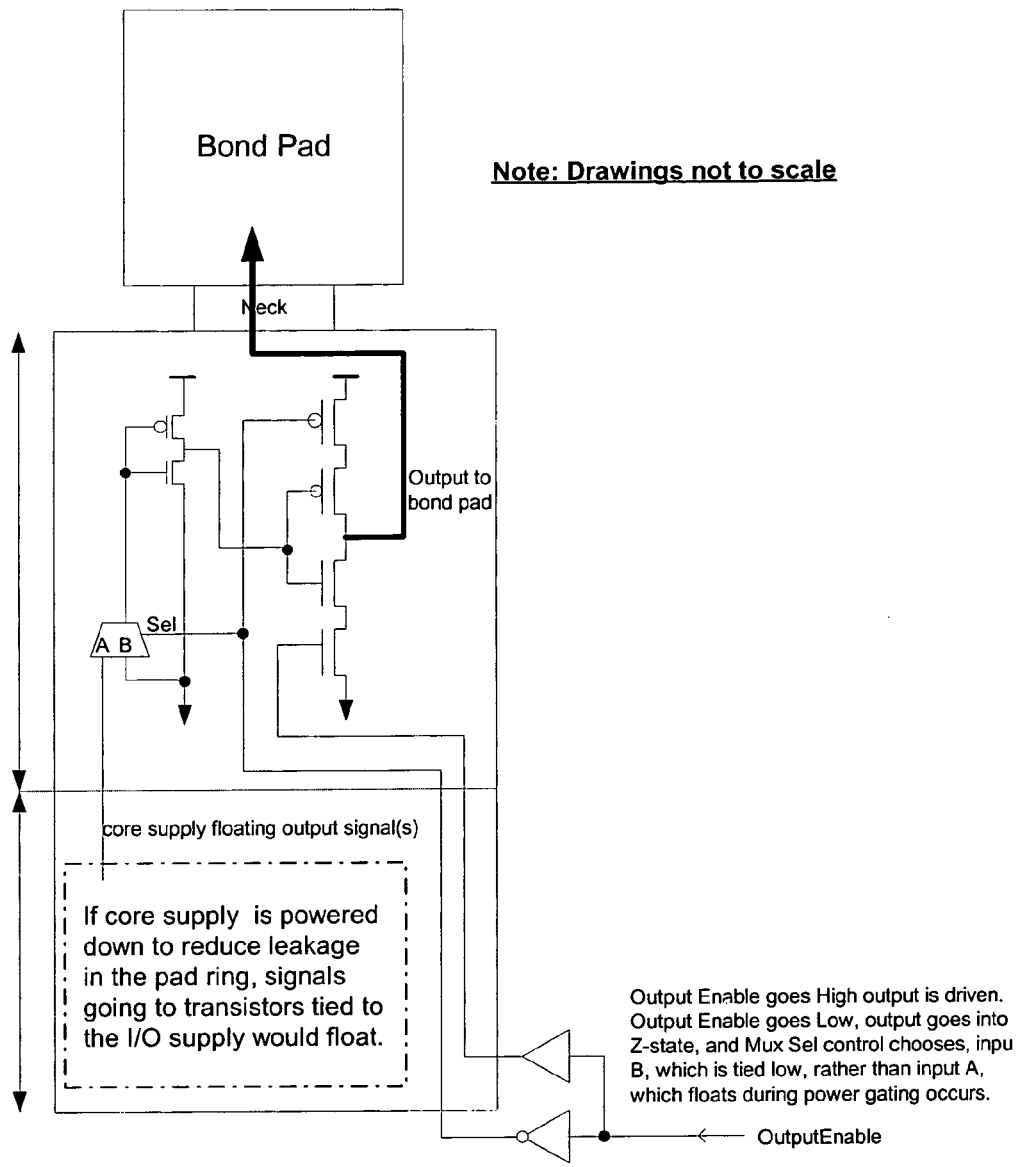
FIG. 17 is an example illustrating adding power gating transistors to the pad ring along side of the VDD core supply macro, which results in increasing the size of the pad ring for pad limited designs, according to specific embodiments of the invention.

FIG. 17 is an example illustrating adding power gating transistors to the pad ring along side of the VDD core supply macro, which results in increasing the size of the pad ring for pad limited designs, according to specific embodiments of the invention. This involves making Power Gating Tolerant I/O macros could also be implemented using OR gates or NOR gates rather than pass gate multiplexors. One of the OR or NOR gate's inputs acts as a control and the other input could potentially float whenever VDDV has been powered down. For example, whenever VDDV has been powered down, the OR or NOR gate control input would be brought high, forcing the OR or NOR gate's output to a hard 1 or 0 respectively which would drive the I/O power supplied transistors within the I/O macro, regardless of the floating voltage driving the other input. When VDDV is active the control signals to these OR or NOR gates would go low so that they would pass the desired value (or an inverted version of it) from the isolation gate's other input to the I/O power supplied transistors within the I/O macro. These OR or NOR gates would preferentially be implemented with 3 or more inputs, where one input would be driven by the floating signal, and the remaining inputs would be tied in parallel to provide the control that produces a hard 1 or 0 output whenever VDDV has been powered down. A similar approach, could be implemented with AND or NAND gates where the control input would be held low, forcing the output to a hard 0 or 1 for the AND or NAND respectively.

The examples shown in FIG. 16 and FIG. 17 describe I/O macros that could have their core VDDV supply powered down, which would be used in conjunction with commonly available CMOS processes having p-type substrates. These embodiments could also be altered to create I/O macros that could have their core ground supply powered down, which would be used in conjunction with less commonly available with n-type substrate MOS processes and could be further modified to produce I/O macros that could have their core power supplies and their core ground supplies turned off simultaneously, which could be used in conjunction with more exotic or future MOS processes. These modifications would be evident to someone skilled in the art.

In general, the I/O VDD supply voltage is usually much higher than the core VDD supply voltage. Transistors that handle larger voltages have larger channel lengths and generally inherently have far less current leakage than core transistors with shorter channel lengths, thus there would be little net reduction in leakage current when gating the I/O VDD power supply in the I/O macros.

In this example, power down control buffers can turn off the transistors in series with VDD and VSS in both the pre-stage and final stages of the I/O output buffers to produce a Z stated output. This prevents a potentially floating signal due to gating the core supply from driving active I/O output transistors. Other embodiments having more driver stages would need additional series transistors that could disconnect them from VDD and VSS.

The power down control buffers generally are placed in the I/O macro's core voltage area because the core supply virtual VDD (VDDV) voltage in the I/O area could be turned off. Thus these control buffers are placed in the core of the design, where they can easily be tied to an active VDD supply.

In this example power down control buffers can turn off the transistors in series with VDD and VSS in the final stage of the I/O output buffers to produce a Z-stated output. This embodiment also uses a pass gate Multiplexor Sel control to choose input B, which is tied low. Thus floating input A will not drive the predriver stage of the output when the pad ring core voltage supply is powered down. Other embodiments may need more multiplexors deselecting floating signals from the core supply voltage section of the I/O that go to the I/O voltage supply section of the I/O. Another example involves standard non-Z-stated output. In this case the final output stage in the above drawing wouldn't have the extra series PMOS and NMOS transistors connected to the power and ground supplies. A control multiplexor (or a different control gate such as an AND gate) would be used force the predriver stage output to a hard 0 or 1 output value, whenever the core supply to the I/O area has been powered down. The power down control buffers would need to be placed in the I/O macro's core voltage area because the core virtual VDD (VDDV) voltage in the I/O area could be turned off. Thus these control buffers would need to be placed in the core of the design, where they could be tied to an active VDD supply.

Other Issues

In general, active IC sub-modules must function properly while other modules could be powered down. Thus output signals from each separate power gated sub-module should go through isolation macros that can tolerate floating input signals, such as: pass gate multiplexors, NOR gates, OR gates, AND gates, NAND gates and so forth. These isolation macros are used to swap potentially floating signals with hard 1 or 0 signal values. These macros are optimally located at the input ports of the top level of the sub-module(s) receiving the potentially floating signals. The isolation macros can be added manually or programmatically, and the isolation gates within a particular power zone should receive individual, or shared, control signals from a common power control unit. The power control unit should also provide power up and down sequence controls to each independently power gated area. The design of the power control unit can vary, but it should contain a state machine that transitions through states that can power up/down one or more independently supplied logic areas. An example description of a power control unit (PCU) design is provided below.

For larger IC's or larger sub-modules sequencing the power up via successive stages, may be needed to suppress potential power surges that may occur. The power control unit should contain the "wake-up" control logic for the IC's core along with the "sleep" mode control logic to power up or down the IC's various sub-modules as needed. Note that depending upon the application at wake-up the IC's core could be powered up all at once, or it may be powered up sequentially module by module to help limit the current draw. Also, if required portions of larger modules could be sequentially powered up to further help reduce the current draw in local areas.

Typical power macros usually have more then one (often three or four) metal output ports used to connect it to the internal metal power supply bus. This invention's power gating concept could be extended to provide separate controls for each individual metal output port coming from VDD power macros, as opposed to a common parallel control for all of the metal ports. Having controls at the individual metal port level would provide finer granularity during and after power up assuming each metal port drives a separate section of logic. If desired, these individual power-sequencing controls could be built into the core VDD supply I/O macro itself, or into a separate power gating I/O macro.

Large power gating transistors can leak substantial amounts of current into the powered down logic, which then provides a current leakage path to the ground supply. Various methodologies can be used individually or in tandem to minimize leakage due to the power gating transistors. These methodologies include: increasing the power gating transistor's channel width, over biasing the gate of the power transistor to provide a more robust "off" state, back-biasing the power-gating transistors to provide a more robust "off" state, and/or using 2 power gating transistors in series with the core supply or I/O supply voltage. The above approaches can reduce the drive capability of the power gating transistors, so it is a good design practice to run simulations to insure that output drive is sufficient drive to meet performance goals.

Other Possible Variations to Specific Embodiments

The above embodiments assume the PMOS power-gating transistors located in the I/O area are inserted between the VDD supply and the logic, which works well with widely used p-type substrate CMOS processing technologies. An analogous embodiment involves inserting NMOS ground gating transistors in the I/O area between the core logic and the VSS ground supply, which works well with less frequently used n-type substrate CMOS processing technologies. Another variant of this embodiment involves inserting PMOS and NMOS ground gating transistors in the I/O area this could be done in conjunction with triple well process technologies or with more exotic further processing technologies. Many of these variations involve modifications or substitutions of parts that will be familiar in the art and within the skill of the ordinary artisan in the art having the benefit of the teachings provided herein.

Application to FPGA Devices

Figure 18:
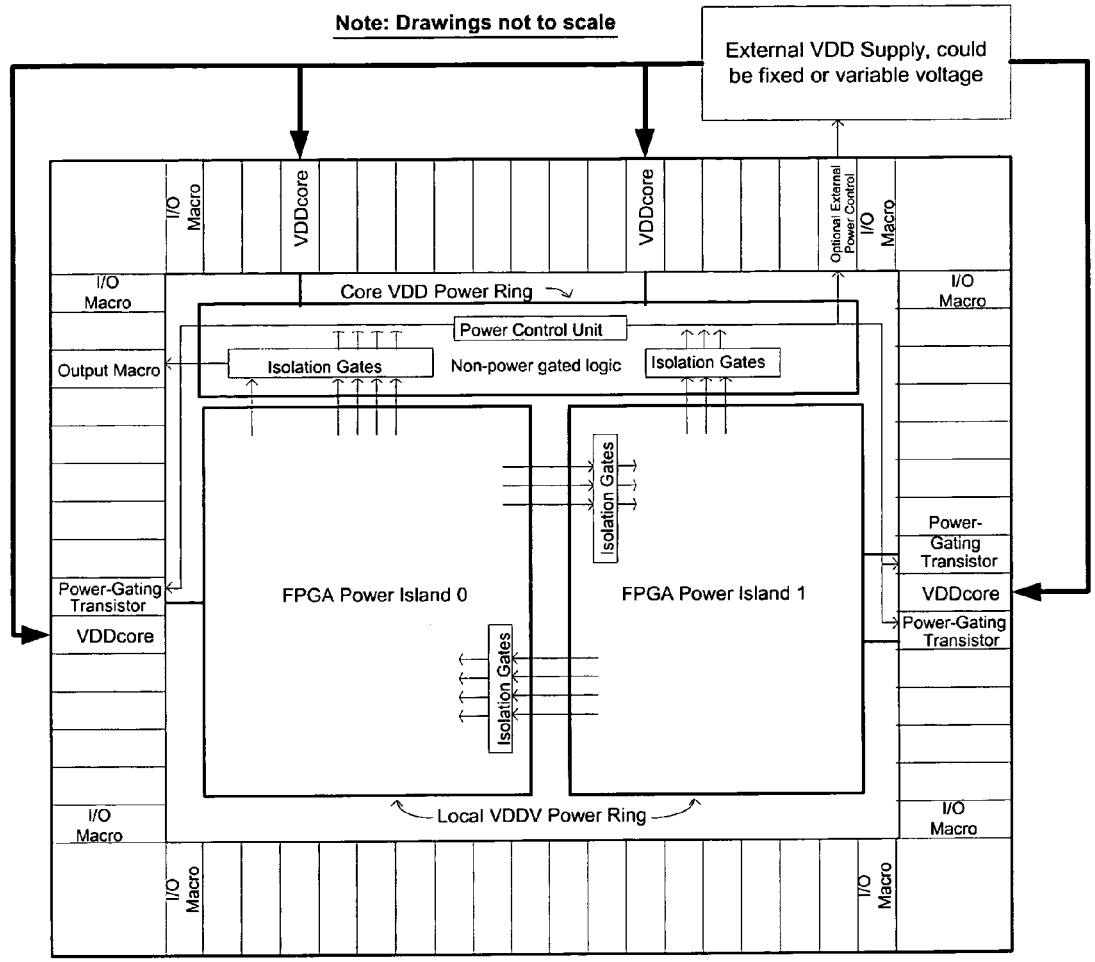
FIG. 18 is an example illustrating an FPGA type IC with power control according to specific embodiments of the invention.

The previously described power management systems according to specific embodiments of the invention can also be applied to FPGA (Field Programmable Gate Arrays), another variety of IC. FIG. 18 is an example illustrating an FPGA type IC with power control according to specific embodiments of the invention. FPGA's come in a wide variety of sizes and utilize a wide variety of IC fabrication processes. Users typically program FPGA's at their own site, and can thus obtain configurable logic without having to design and fabricate expensive dedicated or custom IC's. As FPGA's are made with more advanced processes that use smaller geometries their inherent leakage current will increase, much like other IC's. FPGA's provide the user with a programmable core, which includes programmable logic, flip flops, and power/ground distribution.

According to specific embodiments of the invention, FPGA designs can be enhanced to reduce leakage current by including one or more of the following elements:

1.) Power-gating transistors in the I/O area near the VDD core supply macros.
2.) Separate VDDV power rings within the core of the FPGA.
3.) A power control unit supplied by non-gated core VDD, that is hard wired into the FPGA base array.
4.) Isolation gates within the programmable core of the base array so that they are available for user to prevent active logic from being driven by powered down (floating) signals.

FPGA's according to specific embodiments of the invention can be configured to support powering up/down any number of separate core areas discussed above in this description but the layout of the VDD and VDDV areas would be fixed within each separate base design. This is due to the fact that the power and ground distribution for a given FPGA type is determined when the FPGA is made and in typical modern FPGA's the programmability is provided by very small embedded memories within each programmable "macro-block" not by any actual dynamic change in the implementation on said macro-blocks. Note that as all of the FPGA's internal physical structures are not dynamically alterable (including which macro-blocks get power from which VDD pins) the actual power-layout of the FPGA is in fact fixed.

This however does not preclude the use of the present invention in place of the standard VDD I/O cell, or even the use of the power-multiplexor VDD I/O cell to allow an FPGA to have the operating frequency and VDD levels coordinated, like in any other device using "dynamic voltage scaling" type technology.

VDD Select I/O Cell Embodiments

In the following discussion, the term "transistor" is used to indicate a logical transistor or a transistor function as will be understood in the art. Physically, according to specific embodiments of the invention, this can be a single transistor or a single logical transistor made-up of a number of smaller ones or other logic or circuits that provide a transistor function.

Available power control ICs, such as those provided by National Semiconductor and Maxim Integrated Circuits, currently provide multiple fixed VDD supply outputs along with a single variable VDD supply. Thus, with one known exception, VDD output supplies have fixed VDD levels, that are often set to 1.8V for 180 nm client IC's, 1.3V for 130 nm client IC's, and/or 1.0V for 90 nm for client IC's. This approach supports both varying the voltage uniformly across a client chip using the lone variable VDD supply or providing a single variable VDD "power island" on the client chip, but does not support varying multiple independent VDD supply voltages to multiple subsections of a client chip in an independent manner.

The present invention, according to specific embodiments, enables a client IC to vary core VDD supply voltages to different internal subsections independently and according to specific embodiments while using the previously described power control IC that has one variable VDD supply output and at least one fixed VDD supply output. This approach can also be extended to utilize N (where N could be 0) fixed and M (where M could be 0, but N+M>0) variable VDD levels from a power control IC and thus effectively provide a client IC with independent core VDD supply pins than can potentially have N+M+1 VDD levels: the N available VDD fixed supply levels, the M variable VDD supply level, and an off or power down state.

A VDD select circuit is shown that can be combined with one or more optional analog voltage reduction circuits (techniques for such a circuit are known in the art), which utilizes a given input VDD and outputs for example 0.8 VDD+/−a variance. The voltage reduction circuit according to specific embodiments of the invention, can\be located in the I/O ring, either in it's own cell or as part of another cell, to provide additional levels of VDD granularity. The basic functional unit builds on a power-gating I/O cell described above.

The VDD select I/O cell is a new type of I/O cell that provides the ability to select one (or none, for the powered-off case) of the outputs of multiple power-gating transistors with differing VDD supply levels (either from an external source or an external source reduced by a voltage reduction circuit). These can be selected by control signals within the client chip to supply a single Virtual VDD output as show in FIG. 19. Tying the outputs of the power gating transistors together produces a wired- or type multiplexing function, thus only one power-gating transistor can be on at a time, otherwise the differing VDD supplies will be shorted together. The use of a wired-or approach to provide the VDD multiplexing function is preferred. Also note, the gate control voltages of all the power gating transistors sharing the wired-or connection must use the highest VDD supply level that is provided to the wire-or connected power gating transistors otherwise current could inadvertently leak from a deselected higher level VDD supply to a selected lower level VDD supply.

Although the wired-or embodiment is a preferred embodiment described in detail herein, this is not intended to limit the type of multiplexing function used and other multiplexing functions can be used as will be understood to those of skill in the art. This description assumes use of p-channel power gating transistors; a similar embodiment could be made with N-channel power gating transistors using a wire-or configuration.

The embodiment that has thus been presented includes a centralized I/O cell that utilizes an internal wired-or multiplexing function that provides a single VDD virtual output. A further specific embodiment can be implemented with power gating transistors supplied by different VDD levels that are distributed in the pad ring. These separate power gating transistors would have their VDD Virtual outputs shorted together when connected to the VDD virtual power mesh and thus provide a distributed or virtual equivalent of the wire-or multiplexing function discussed in the centralized I/O cell. Selection of the optimal embodiment would depend upon various design tradeoffs.

Note that the invention is not limited to cases where two or more external VDD levels are present, but may also be used with one or more of the I/O cell based optional analog voltage reduction circuits to provide multiple VDDs from a single input VDD level. Additionally the voltage reduction circuit can be used without the VDD select circuit to provide a fixed lower VDD from the input VDD provided, again this could be combined with a power-gating transistor to provide both lowered input VDD and powered-off levels to a portion of the core.

Figure 19:
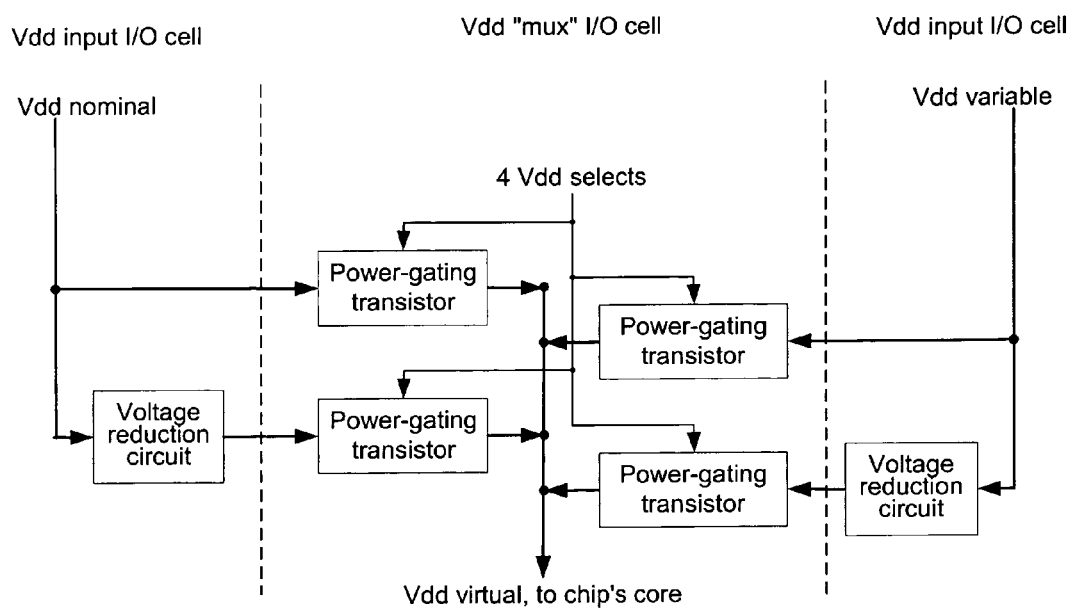
FIG. 19 illustrates an example circuit block schematic of a VDD select I/O cell in combination with the above described power islands according to specific embodiments of the invention.

FIG. 19 shows the two external VDD supplies going to the client IC, VDD variable and VDD nominal, each of which supplies both a voltage reduction circuit which feeds into a power-gating transistor and has a direct connection to another power-gating transistor. Thus there are 4 power-gating transistors, with 4 different VDD supply levels. Each of the 4 power-gating transistors has a separate select (enable) as a "wire-or" as shown in this example. The valid values for the enable controls are: 0000, 0001, 0010, 0100, 1000. These correspond to providing VDD virtual supply levels to the chip's core of: powered-off, reduced VDD variable, VDD variable, reduced VDD nominal, and VDD nominal.

Note that, if needed, more input VDD supplies could be used and multiple Voltage reduction circuits with differing amounts of voltage reduction could also be utilized, but most current applications will only need a subset of this functionality.

While FIG. 19 shows the two VDD input cells as adjacent to the VDD select circuit, this is not a requirement, typically either one or both VDD input cells will be separated from the circuit by other I/O macro cells, and their VDD supply outputs will be connected by a common the VDD virtual. Additionally while the voltage reduction circuits are shown as part of the VDD core supply macros this is not a requirement, depending on the implementation they maybe part of the wire-or cell or as standalone cells or as a part of still other cells (such as the VDD input cell), depending upon implementation trade offs.

Another embodiment may be further understood with reference to FIG. 14. As in that figure, the VDD multiplexor can be placed in the corner of an IC layout when desired for spacing or other considerations in specific implementations. In this case, the VDDV, instead of coming out of the I/O multiplexor directly to the core as shown in FIG. 19, would be routed to one or more I/O cells and from there routed to the core.

The advantage of this approach is it allows different subsections of an IC to utilized different VDD supply levels while requiring no additional changes to the standard ASIC design flows. This approach is also fully compatible with industry trend, of using multiple voltage/power "islands" within an IC, where the supply voltage variation is controlled by a CPU within the client IC that controls an off-chip voltage regulator.

Additionally, techniques for placement, etc., described above, such as end-extension of I/O cells or corner placement, also apply to this further specific embodiment.

Figure 20:
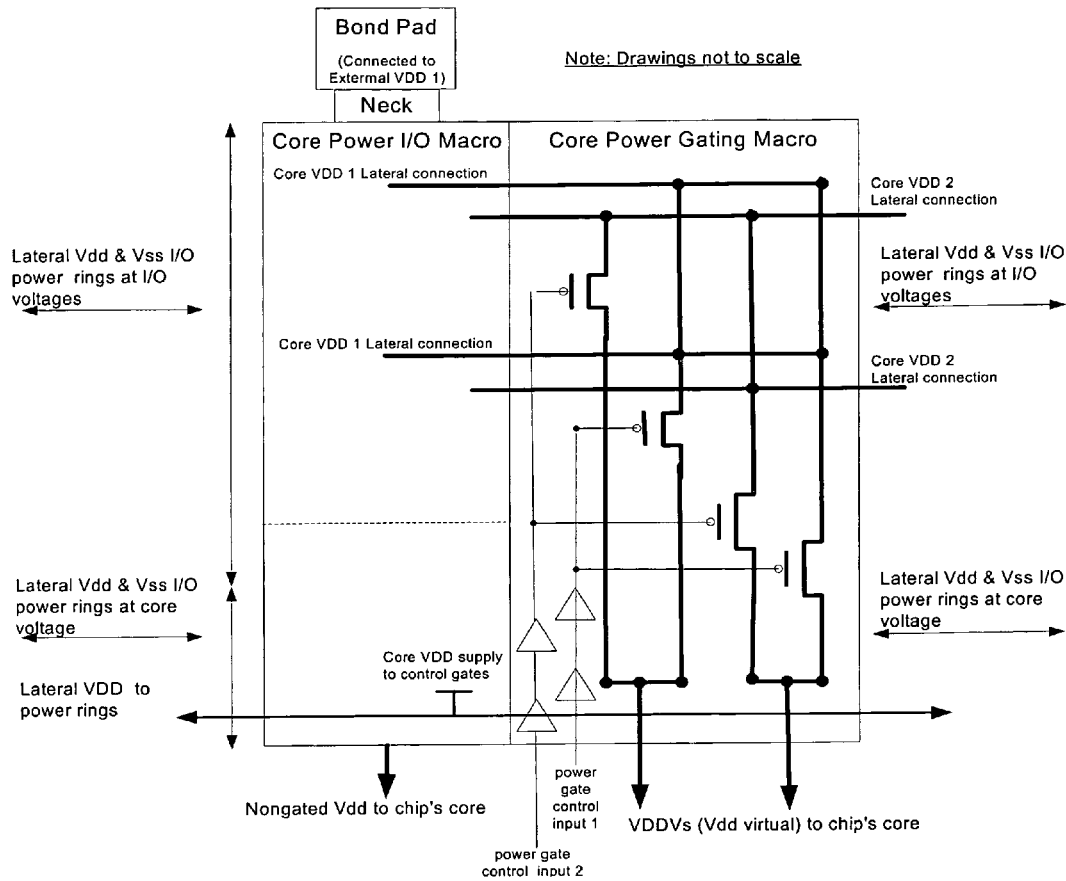
FIG. 20 illustrates an example circuit block schematic of a VDD select I/O cell in combination with the above described power islands according to specific embodiments of the invention.

Further while diagrams are not provided showing internal details, extrapolation of such diagrams will be obvious to one skilled in the art, given the above material. Furthermore, the various placement options, such as corner placement, expansion of I/O ring size, etc. that are discussed above can be used to enable the VDD Select I/O cell. Such implementations will be understood by persons of ordinary skill in the art have the benefit of the teachings provided herein. FIG. 20 illustrates an example circuit block schematic of a VDD select I/O cell in combination with the above described power islands according to specific embodiments of the invention.

Power Zoning Control Unit and Overview

The present invention has specific embodiments within the field of integrated circuit designs that incorporating one or more different "power zoning" design schemes. This discussion provides further details of various power zoning issues to further illustrate aspects and applications of the present invention in specific embodiments. Power zoning technology as generally known in the industry is used to minimize deep sleep leakage current consumption, often while enabling IC's to be designed with standard CMOS libraries. The most basic PCU implementation supports two core power zones, which can be referred to as the main power zone (MPZ) that contains most (often over 99%) of the core logic, plus a small deep sleep power zone (DSPZ) which is always active if the IC is active and could also be referred to as the "always on" power zone. Large PMOS power gating transistors according to specific embodiment of the present invention are placed in series with most core VDD power pads within an IC's I/O area as discussed herein to dynamically power up/down the IC's main core power zone as needed. Power gating transistors are not used to gate power to the deep sleep power zone, because this power zone must remain active so that it will able to power up the main power zone when needed. Such as when a "wake-up" timer interrupt or some other "wake-up" event occurs or is detected by the deep sleep power zone.

During system power up, the deep sleep zone is responsible for self-reset, self-initialization, powering down the main core power zone and disabling any on chip PLL's. During normal operation the deep sleep power zone responds to a host's external wakeup signal and provides power and control signals that power up/down the IC's main core power zone, controls the isolation gates, and enables/disables and any PLL's on the IC. In addition, the deep sleep zone contains internal logic needed to support a standalone bi-directional pass through mode if needed. Often the DSPZ is a simple fixed sequence state machine that detects a "wake-up event and proceeds to power-up the rest of the chip, thus the simplest DSPZ may consist of just a few hundred gates.

During system power up the deep sleep zone should be responsible for self-reset, self-initialization, powering up the main core power zone and enabling any on chip PLL's. During system down it may optionally power down the remaining power zones and when done cause its own power to be turned off. While during normal operation the deep sleep power zone in response to a "wake-up" event, either internally or externally generated. Provides power and control signals that power up/down the IC's main core power zone, disables/enables all of the isolation gates and level-shifters at each power zone boundary, and any PLL's on the IC.

Then normal order of event for powering up the other zones is:
1. Optionally send a "stop" signal to any "active" zones and optionally wait till all zones are "stopped" or wait for a specific amount of time.
2. Enable the inter-zone isolation gates.
3. Optionally disable/bypass the PLL's for the affected zones
4. Set the transistors controlling the affected power-zones to "power-off".

Note the inter-zone isolation gates going to units that will remain powered up must also be powered, while those between powered down zones maybe safely powered down.

Powering down runs the steps in the following approximately reverse order:
1. Enable the inter-zone isolation gates.
2. Set the transistors controlling the affected power-zones to "power-on".
3. Optionally enable (in bypass mode) the PLL's for the affected zones and let them begin stabilizing.
4. Wait for the power-on transistors (and PLL's if needed) and their corresponding zones to power stabilize
5. Send a reset signal to all the affected zones to put them in a known state
6. Disable the inter-zone isolation gates.
7. Optionally send a "start" signal to the zones that need it.

The discussion below provides some further examples of hardware design for the deep sleep power zone and associated power control circuitry that can be used in association with specific embodiments of the invention. Other details that may be useful in specific embodiments are commonly understood in the art.

Power Gating Pad Overview

A deep sleep zone generally provides three separate control signals required to turn on/off the I/O power gating transistors. Combinations of these control signals are used to place the power gating transistors in different states. An example is shown in Table 1.

TABLE 1

POWER GATING TRANSISTOR CONTROL SIGNAL COMBINATIONS

| Nchan | Pchan | Overdr | |
|---|---|---|---|
| 0 | 0 | 0 | Not allowed, invalid input combination |
| 0 | 0 | 1 | Rapidly turn off power gating transistors to turn off MPZ |
| 0 | 1 | 0 | Over-bias power gating transistors, minimize MPZ leakage |
| 0 | 1 | 1 | Invalid/not yet defined |
| 1 | 0 | 0 | Invalid/not yet defined |
| 1 | 0 | 1 | Invalid/not yet defined |
| 1 | 1 | 0 | Invalid/not yet defined |
| 1 | 1 | 1 | Turn on power gating transistor to power up MPZ |

Figure 21:
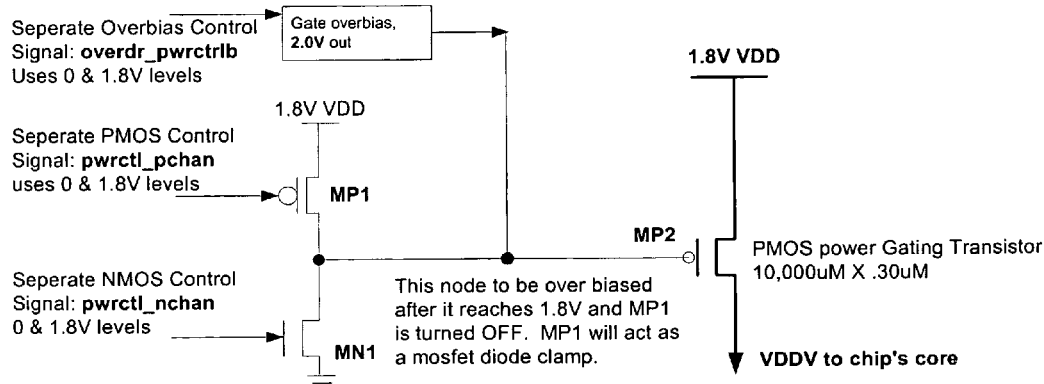
FIG. 21 illustrates an example transistor diagram of a power-gating pad with control signals illustrating overdriving according to specific embodiments of the invention.

If needed, over-biasing circuits can be added to the power gating transistor control logic for example to bring their gates to 2.0V rather than the standard 1.8V, which will reduce the leakage current by a further 99%. FIG. 21 illustrates an example transistor diagram of a power-gating pad with control signals illustrating overdriving according to specific embodiments of the invention. The over-biasing circuits produce relatively small currents, and take too long to turn off the power gating transistors on their own. Thus, generally, the power gating transistors should be turned off using the large MN1 and MP1 transistors to rapidly force the gates of the power gating transistors to 1.8V, afterwards the power gating transistors should be over-biased to 2.0V. When over-biasing the power gating transistors, the pchan_pwrctrl signal should go high, while MN1 remains low. These conditions result in MP1 acting as a MOSFET diode, which would become the last stage of a simple voltage divider from 3.3V to 1.8V that would be enabled by the overdr_pwrctrlb signal if extra leakage reduction is required. Another over-biasing circuit that could be used is a charge pump, which could also be turned on and off by the overdr_pwrctrlb signal. Note that all specific signal configurations and voltage levels are just examples, and different configurations embodying the invention can be developed for different applications.

TABLE 2

POWER GATING TRANSISTOR CONTROL SIGNAL DEFINITIONS

Power Control Signal:

| | |
|---|---|
| nchan_pwrctrl | 0: Turns off MN1, which turns off power gating transistor MP2 to power down MPZ.<br>1: Turns on MN1, which turns on power gating transistor MP2. |
| pchan_pwrctrl | 0: Turns on MP1, which rapidly turnoffs power gating transistor MP2.<br>1: Turns off MP1, and turns on MP2. Also, after MP2 has been turned off, turn off both MP1 and turn off MN1 before turning on the over-biasing circuit. |
| overdr_pwrctrlb | 0: Turns on over-biasing circuit, which slowly over-biases power gating transistor to 2.0 V to reduce the channel leakage. In this mode MP1 should turned off, so its' gate goes to 1.8 V and it acts a MOSFET diode, and completes the 3.3 V to 1.8 V voltage divider used to produce the over-biasing voltage.<br>1: Turns off over-biasing circuit. |

PCU State Machine Design

Various PCU state machines can be developed for specific applications. One example has the input and output signal information provided in the state the signal tables below.

TABLE 3

PCU STATE MACHINE INPUT CONTROL SIGNALS

PCU Input Controls

| | |
|---|---|
| Resetpcub | Internal signal from PCU reset logic.<br>0: forces the PCU into its reset (sleep) state.<br>1: Allows the PCU to transition to other states. |
| Deepsleepb | External signal that uses an unbonded I/O macro containing a pulldown transistor in production packages. Can externally bias this signal in prototype package for characterization purposes. Sleep state will reduce leakage current by 98% versus the when the chip is powered on and idle. Deep sleep will reduce leakage current by an additional 1 to 2 orders of magnitude.<br>0: PCU to idle in deep sleep state<br>1: PCU to idle in sleep state |
| Wakeupb | External control signal from host interface, this must be high during initial power up.<br>0: PCU to exit idle sleep state, and wake up the MPZ.<br>1: PCU stays in or returns to idle state, and MPZ goes into sleep state. |

TABLE 4

POWER GATING TRANSISTOR CONTROL SIGNAL COMBINATIONS

| Resetpcub | Deepsleepb | wakeupb | |
|---|---|---|---|
| 0 | 0 | 0 | Invalid input combination, but go to or stay in sleep state |
| 0 | 0 | 1 | Go to sleep state |
| 0 | 1 | 0 | Invalid input combination, but go to or stay in deep sleep state |
| 0 | 1 | 1 | Go to deep sleep state |
| 1 | 0 | 0 | Wake up from deep sleep state |
| 1 | 0 | 1 | Stay in deep sleep state |
| 1 | 1 | 0 | Wake up from sleep state |
| 1 | 1 | 1 | Stay in sleep state |

TABLE 5

PCU STATE MACHINE OUTPUT SIGNALS

PCU Output Signals

| | |
|---|---|
| resetack | 0: PCU state machine is in the reset state, this signal disables the reset from the power on reset logic.<br>1: PCU state machine still initializing to the reset state. |
| MPZresetb | 0: Resets Main Power Zone<br>1: Main Power Zone no longer being reset. |
| PLLon | 0: Turn off PLL, put in bypass mode<br>1: Turn on PLL |
| nchan_pwrctrl | 0: Power down MPZ for sleep and deep sleep modes.<br>1: Power up MPZ. |
| pchan_pwrctrl | 0: Rapid power down of MPZ to put in sleep mode.<br>1: Power up MPZ or put MPZ into deep sleep mode. Only enter deep sleep mode after cycling through sleep mode. The Power Gating Pad Overview section explains how this signal can both power up the MPZ or put the MPZ into deep sleep mode. |
| overdr_pwrctrlb | 0: Put MPZ in deep sleep mode<br>1: MPZ exits deep sleep mode. |

Figure 22:
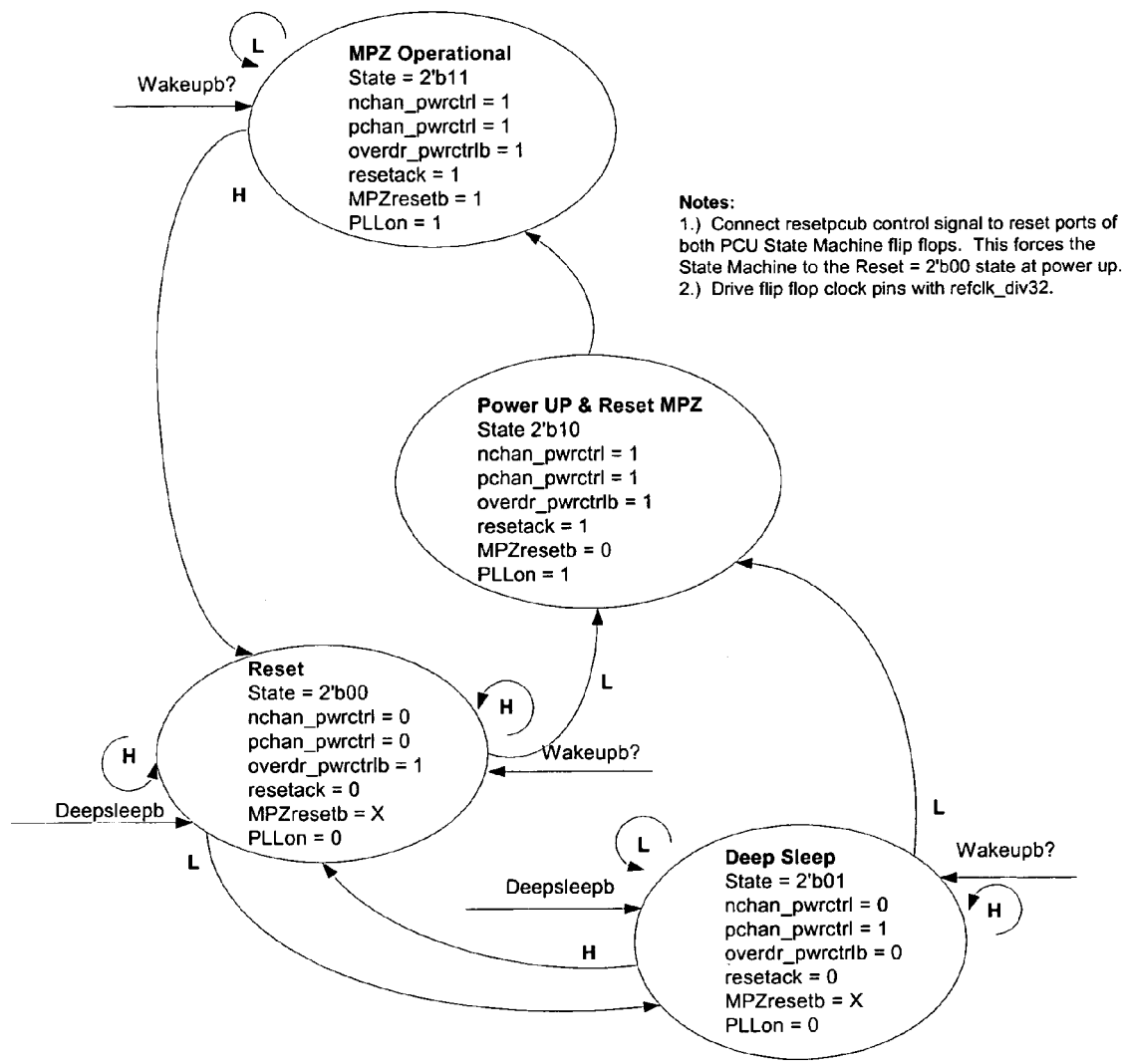
FIG. 22 illustrates an example power control state machine state diagram that can be used for modeling or generating power control signals according to specific embodiments of the invention.

FIG. 22 illustrates an example power control state machine state diagram that can be used for modeling or generating power control signals according to specific embodiments of the invention. This state machine has four states: reset, deep sleep, powerup & reset MPZ, and MPZ operational. These four states can be mapped to 2 flip flops and assigned as 2'b00, 2'b01, 2'b10 and 2'b11 respectively. The outputs generated when in each state are listed within the state bubbles (ovals) shown in the diagram. The input signals are shown as arrows to the state bubbles, and the state-to-state transitions are shown using arrows depending upon the H (high) and L (low) values of the inputs.

The PCU state machine described in this document can easily be expanded to provide control signals for N additional power zones. The IC's core should contain the always on or DSPZ, along with the other N power zones. The PCU state machine would need to receive control signals telling it to transition to additional states that enable power and toggle reset or cut the power to the N power zones as required. Following the example shown in this document, additional isolation gates and control signals would be needed to insure signals from the powered down zones don't drive transistors in active zones. If applicable, a preferred approach that minimizes logic in the DSPZ and helps reduce leakage current, would be to utilize the core power zone, that always wake's up first and goes to sleep last, contain an additional state machine that performs some of the enhanced PCU state machine functionality, and powers up/down and resets the remaining power zones as needed. In any event, the controlling state machine would need to have at least 2 additional states to support each additional power zone. One state to power up and assert reset to the power zone, and the other to support normal operation.

Pass Through Mode Support Logic

Many IC's support pass though modes where the Host signals go to/from clients even when their MPZ has been powered down. Likewise, in the present invention, in various embodiments, pass through mode may need to be supported in either power up or power down states, and different control mechanisms are required for these different conditions. In one example, an IC can use a Pass Through Control Register located in the MPZ, which controls a multiplexor that selects either pass through data, or data from the IC's core logic. The Pass Through Control Register can be powered down, so the output from this Register must go through an isolation gate before going to the DSPZ. The MPZ is powered down when wakeupb is high, in this condition the isolation gate will produce a default 0 output if NOR based or a default 1 output if OR based. This default isolation gate output value would be used to control the multiplexors that select data from the pass through logic and the IC's core logic. When wakeupb is low the MPZ is powered on, in this case the isolation gates pass the control information from the Pass Through Control Register to the multiplexors that select data from the pass through logic or IC's core logic. This example also contains JTAG I/O test logic, which should be within the MPZ, but it is also closely associated with the I/O macros.

Example Layout and Synthesis Implementation Issues

In a typical embodiment, much of the PCU logic may be implemented by custom design, because current synthesis tools will probably do a poor job supporting power zones, isolation gates, internal reset logic and clock dividers. The PCU state machine can be synthesized and combined with the rest of the PCU logic. Retaining the isolation gates throughout synthesis is important, since these gates should not be replaced with equivalent logic that provides less or no isolation protection. The power dissipation of the DSPZ increases as the amount of logic within the DSPZ increases, thus design tradeoffs should be selected that minimize the amount of DSPZ logic. All JTAG test logic should be located in the MPZ to help simplify the design process.

In this example the MPZ will fill most of the IC's core area, and this will be powered by VDDV, the virtual VDD supply. The power ports of the power gating transistors should be connected to the core VDDV power rings much as standard core VDD macros are hooked up to standard VDD power rings. Only a few small areas along the edge of the IC's core would need to be connected to pure VDD, forming VDD islands, which will contain all DSPZ logic. These small DSPZ islands and the MPZ can all share common VSS power rings.

The power ports from the standard VDD pads could easily be connected to the small DSPZ islands. To help streamline the design effort the number of DSPZ islands should be minimized, because each area can require significant handcrafting. These DSPZ islands should only contain the buffers multiplexors and isolation gates needed to support pass through mode when the MPZ has been powered down. Sets of serial buffers may be needed to quickly propagate DSPZ pass through signals across the chip's core. These serial buffers should be hand placed in successive DSPZ islands. There should also be a "main" DSPZ island containing the PCU state machine, PCU reset logic, and the PCU reference clock divider logic. The "main" DSPZ island should be located near the PLL since it taps off the PLL's reference clock and controls the PLL's feed through mode port.

Macros destined for the DSPZ cannot be co-located with MPZ macros. The DSPZ and MPZ macros must be located only within their respective power zones. Use of exclusive grouping commands for gate placements is highly recommended. Scripts should be used to check all macros in the DSPZ islands to insure all DSPZ macros are in the DSPZ islands, and no MPZ gates are present. The scripts should also check to see that only MPZ macros are in the MPZ, and no DSPZ macros are present. It is recommended that all macros destined for the DSPZ have instance names beginning with a dspz_prefix since this will stream line efforts to write checking scripts needed insure the DSPZ and MPZ macros are placed in the correct areas. The same mutual exclusivity for gate placement applies if there are multiple core power zones. Thus gates from one power zone should not be placed with gates in a different power zone. The power-gating macro in the I/O area generally should use the same footprint as a standard VDD pad when possible.

Figure 23:
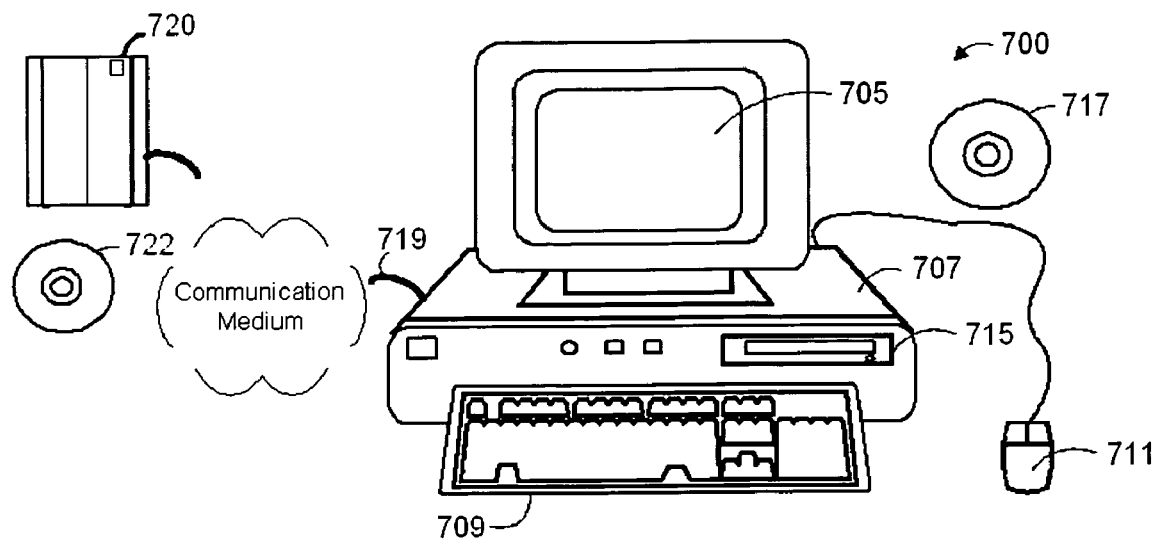
FIG. 23 is a block diagram showing a representative example logic device in which various aspects of the present invention may be embodied, in one example aspect related to a workstation as discussed herein.

FIG. 23 is a block diagram showing a representative example logic device in which various aspects of the present invention may be embodied, in one example aspect related to a workstation as discussed herein. As will be understood from the teachings provided herein, the invention can be implemented in hardware and/or software. The invention or components thereof may be embodied in a fixed media program component containing logic instructions and/or data that when loaded into an appropriately configured computing device cause that device to perform according to the invention. A fixed media containing logic instructions may be on a fixed media for physically loading into a computer or workstation or a fixed media containing logic instructions may reside on a remote server that is accessed through a communication medium in order to download information or logic components.

FIG. 23 shows an information appliance or digital device 700 that may be understood as a logical apparatus that can perform logical operations regarding circuit design, testing, emulation, or layout and/or analysis as described herein. Such a device can be embodied as a general purpose computer system or workstation running logical instructions to perform according to specific embodiments of the present invention. Such a device can also be custom and/or specialized design or testing hardware that integrates logic processing into a machine for performing various operations, such as circuit layout or testing. In general, the logic processing components of a device according to specific embodiments of the present invention is able to read instructions from media 717 and/or network port 719, which can optionally be connected to server 720 having fixed media 722. Apparatus 700 can thereafter use those instructions to direct actions or perform analysis as understood in the art and described herein. One type of logical apparatus that may embody the invention is a computer system as illustrated in 700, containing CPU 707, optional input devices 709 and 711, storage media (such as disk drives) 715 and optional monitor 705. Fixed media 717, or fixed media 722 over port 719, may be used to program such a system and may represent a disk-type optical or magnetic media, magnetic tape, solid state dynamic or static memory, etc. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

OTHER EMBODIMENTS

The invention has now been explained with reference to specific embodiments. Other embodiments will be apparent to those of skill in the art. In particular, the client's digital computing device has been illustrated as a personal computer.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of reducing power usage in an integrated circuit comprising:
    establishing separate power islands in said integrated circuit; said power islands separating functional regions in a logic core of said integrated circuit to allow for separated power management of said separate functional regions; said integrated circuit being of a type comprising an I/O ring surrounding said logic core;
    establishing one or more power control transistors in said I/O ring of said integrated circuit,
    using said one or more power control transistors in said I/O ring to control passage of power to one or more of said power-islands such that said power islands in said logic core; thereby performing a multiplex function in said I/O ring, said multiplex function making available a plurality of different voltage levels for said islands; and are selectively disconnected from a power source by said power control transistors in said I/O ring.

2. The method according to claim 1 further comprising:
    providing a control signal generated externally to said one or more power control transistors to said transistors.

3. The method according to claim 2 further wherein:
    said control signal is generated by logic located in said integrated circuit.

4. The method according to claim 2 further wherein:
    said control signal is generated by logic located external to said integrated circuit.

5. The method according to claim 1 further comprising:
    establishing a library of logic descriptions of power transistor I/O cells to allow use of said method with standard integrated circuit computer aided design tools.

6. The method according to claim 1 further comprising:
    providing for multiple power inputs to a single power control transistor and/or multiple independently controlled power control transistors to a single power input.

7. The method according to claim 2 further wherein:
    said control signal is overdriven.

8. The method according to claim 1 further comprising:
    wherein said integrated circuit is a programmable logic device;
    wherein said power islands provide power management for two or more different programmable areas of said programmable logic device.

9. The method according to claim 1 further comprising:
    integrating electrostatic discharge protection into circuitry enabling said separate power islands.

10. The method according to claim 1 further comprising:
    configuring a selector in said I/O ring, said selector making available a plurality of different voltage levels for said islands.

11. The method according to claim 10 further wherein said selector can be placed according to a placement strategy selected from the group consisting of:
    corner placement,
    expansion of I/O ring size; and
    increasing height of I/O cells.

12. The method according to claim 1 further wherein:
    using one or more of said power control transistors to provide of said multiplex function said power control transistors located in said I/O ring.

13. The method according to claim 12 further wherein:
    at least one of said inputs to said multiplexing function is the output of a power control transistor input of which is the output of a voltage reduction circuit also located in said I/O ring.

14. The method according to claim 10 further wherein:
    said multiplexing function is performed in said I/O ring, so that it is transparent to said power island.

15. The method according to claim 1 further wherein:
    controls for said transistors are configured such that either one or none will allow passage of power to said power-island, thus providing at least three different power levels to the power-island: VDD1, VDD2 or 0V.

16. The method according to claim 1 further comprising:
    placing one or more voltage reduction circuits between said power source and said one or more power control transistors allowing for different virtual power levels to be delivered to said I/C core.

17. The method according to claim 1 further wherein:
    said power control transistors can be placed according to a placement strategy selected from the group consisting of:
    corner placement;
    expansion of I/O ring size; and
    increasing height of I/O cells.

18. An information appliance with one or more advanced power control components operated in accordance with the method of claim 1.

19. An integrated circuit fabrication wafer containing circuitry that when active includes logic operated in accordance with the method of claim 1.

20. A computer readable medium containing computer interpretable instructions that when loaded into an appropriately configuration information processing device will cause the device to operate in accordance with the method of claim 1 in an emulation system.

21. An integrated circuit device having power management comprising:
    a logic core roughly centrally configured on an integrated circuit device, said logic core comprising a large plurality of logic circuits;
    one or more power supply inputs, said power supply inputs providing voltage and or current energy for operating said logic core;
    an I/O ring roughly surrounding said logic core, said I/O ring providing connections and support circuitry for connecting said logic core to one or more external connections; and
    a least one power control transistor in said I/O ring, said power control transistor providing the ability to vary power levels to islands of logic circuits within said logic core, wherein said logic core and said I/O ring including said power control transistors are circuits integrated on a single integrate circuit device, said device connected to other logic through external transmission connections to a plurality of bond pads; thereby performing a multiplex function in said I/O ring, said multiplex function making available a plurality of different voltage levels for said islands.

22. The device according to claim 21 further comprising:
    power controller circuitry with-in said logic core, said power control circuitry generating one or more signals controlling said power control transistors.

23. A computer readable medium containing computer interpretable instructions describing a circuit layout for an integrated circuit that, when constructed according to said descriptions, will configure a circuit to embody the apparatus described in claim 21.

* * * * *